United States Patent
Fukuda

(10) Patent No.: US 7,586,361 B2
(45) Date of Patent: *Sep. 8, 2009

(54) SEMICONDUCTOR DEVICE COMPRISING A CHARGE PUMP OPERATED BY CLOCK SIGNALS

(75) Inventor: Koichi Fukuda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 47 days.

This patent is subject to a terminal disclaimer.

(21) Appl. No.: 11/761,585

(22) Filed: Jun. 12, 2007

(65) Prior Publication Data

US 2007/0229146 A1 Oct. 4, 2007

Related U.S. Application Data

(63) Continuation of application No. 11/019,294, filed on Dec. 23, 2004, now Pat. No. 7,239,193.

(30) Foreign Application Priority Data

Dec. 25, 2003 (JP) .............................. 2003-429150

(51) Int. Cl.
*G05F 1/10* (2006.01)
*G05F 3/02* (2006.01)

(52) U.S. Cl. .................................................... 327/536

(58) Field of Classification Search .......... 327/535–537
See application file for complete search history.

(56) References Cited

U.S. PATENT DOCUMENTS 4,970,409 A 11/1990 Wada et al.
6,297,687 B1 * 10/2001 Sugimura .................. 327/536
6,486,729 B2 11/2002 Imamiya
6,670,844 B2 * 12/2003 Kobayashi et al. .......... 327/536
6,781,440 B2 8/2004 Huang

FOREIGN PATENT DOCUMENTS

| JP | 64001472 A | * | 1/1989 |
| JP | 11-39855 | | 2/1999 |
| JP | 11-41917 | | 2/1999 |
| JP | 11-273379 | | 10/1999 |
| JP | 2000-60110 | | 2/2000 |

* cited by examiner

*Primary Examiner*—Quan Tra
(74) *Attorney, Agent, or Firm*—Oblon, Spivak, McClelland, Maier & Neustadt, P.C.

(57) ABSTRACT

This disclosure concerns a semiconductor device that includes a booster portion including first switches and first capacitors; and a voltage converter comprising boosting stages each of which includes a second capacitor whose one end is connected to a first voltage source via a second switch and whose other end is connected to a reference voltage via a third switch, the second capacitor being charged on the basis of a voltage difference between the first voltage source and the reference voltage, and comprising fourth switches each of which is provided between two of the boosting stages to control the number of the second capacitors connected in series between a second power source and the other ends of the first capacitors according to the voltages of the first and second voltage sources, the voltage converter outputting clock signals with phases opposed to each other to adjacent ones of the first capacitors.

18 Claims, 12 Drawing Sheets

VOLTAGE CONVERTING CIRCUIT VA

MODE 1

MODE 2

MODE 3

VOLTAGE CONVERTING CIRCUIT VE

SEMICONDUCTOR DEVICE COMPRISING A CHARGE PUMP OPERATED BY CLOCK SIGNALS

CROSS-REFERENCE TO RELATED APPLICATION

This application is a continuation of U.S. patent application Ser. No. 11/019,294, filed Dec. 23, 2004, now U.S. Pat. No. 7,239,193 which is based upon and claims the benefit of priority from the prior Japanese Patent Application No. 2003-429150, filed on Dec. 25, 2003, the entire contents of each of which are incorporated herein by reference.

BACKGROUND OF THE INVENTION

1. Field of the Invention

The present invention relates to a semiconductor device provided with a booster circuit.

2. Background Art

FIG. 15 is a circuit diagram of a booster circuit 10 housed in a conventional semiconductor device (JP2002-51538A, hereinafter, referred to as Patent literature 1).

The booster circuit 10 is provided with transistors $QNA_1$ to $QNA_m$ connected in series between an input IN and an output OUT and capacitors $CA_1$ to $CA_m$ whose one ends are respectively connected to the respective transistors $QNA_1$ to $QNA_m$. The other ends of the capacitors $CA_1$ to $CA_m$ are connected to a clock supplying source via a voltage converting portion 12, The voltage converting portion 12 has voltage converting circuits $VB_1$ to $VB_m$ connected to respective other ends of the respective capacitors $CA_1$ to $CA_m$. The voltage converting circuits $VB_1$ to $VB_m$ receive clock signals Φ and Φbar having phases opposed to each other alternately and they boosts voltages of these clock signals to supply them to the capacitors $CA_1$ to $CA_m$. Timing charts of the clock signal Φ and Φbar are illustrated in FIG. 17. Thereby, the booster portion 11 boosts the input voltage Vin to output an output voltage Vout higher than the input voltage Vin.

FIG. 16 is a circuit diagram illustrating a constitution of one (hereinafter, called "voltage converting circuit VB) of the voltage converting circuits VB1 to VBm. The voltage converting circuit VB has a plurality of boosting stages including capacitors CB1 to CBk whose one ends are connected to a voltage source Vin via n-type transistors QNB1 to QNBk and whose other ends are grounded via n-type transistors QNC1 to QNCk. The voltage converting circuit VB further has p-type transistors QPA1 to QPAk. The transistors QPA1 to QPAk can connect all the capacitors CB1 to CBk in series between input and output.

Since the transistors QNB1 to QNBk and QNC1 to QNCk, and the transistors QPA1 to QPAk are different in conductive type, they are alternately switched by the clock signal Φ or Φbar. When the clock signal Φ or Φbar is High, the respective capacitors $CB_1$ to $CB_k$ are connected in parallel between the input voltage Vin and the ground, and when the clock signal Φ or Φbar is Low, the capacitors $CB_1$ to $CB_k$ are connected in series between the input voltage Vin and the output CLKOUT. As illustrated in FIG. 17, according to repetition of the clock signal Φ or Φbar between High and Low, the voltage converting circuit VB boosts the input voltage Vin to output the same from the output CLKOUT to either of the other ends of the capacitor $CA_1$ to $CA_m$.

Now, it is preferable that a power source voltage supplied externally of the semiconductor device (hereinafter, also simply called "power source voltage") is low for reducing power consumption. Conventionally, the power source voltage is lowered stepwise such as 5V and 3.3V (or 2.5V). In recent years, the power source voltage is further lowered from 3.3V to 1.8V. In such a transient term where the power source voltage is being lowered in this manner, a semiconductor device is required to accommodate a plurality of power source voltages with voltages different from one another.

Further, even in a semiconductor device corresponding to a single power source voltage in an ordinary operation, there occurs a case that a power source voltage higher than a power source voltage in the ordinary operation is used in a test step before shipping. For example, in order to make a judgment about an initial defective, a high voltage is used as a power source for accelerating failure in a burn-in step where a device is made defective by accelerating the defective condition. Thereby, it is preferable that the semiconductor device corresponds to a plurality of power source voltages with different voltages.

In general, in case that an operation of a semiconductor device is ensured when a power source voltage applied externally is in a range of Vccmin to Vccmax, such a design is made that the booster circuit outputs a desired output voltage when the power source voltage is Vccmin. An internal supply voltage (hereinafter, simply called "supply voltage") Vin is an external power source voltage itself or a voltage obtained by voltage-reducing this voltage, and it increases/decreases depending on the power source voltage. Thereby, assuming that the supply voltage Vin is in a range of Vinmin to Vinmax, the booster circuit is designed such that the supply voltage Vin outputs a desired output voltage, when the supply voltage Vin is Vinmin. For example, when voltages with two different ranges of 1.8V and 3V are used as the power source voltage Vcc, such a setting can be made that Vin=1.5V in case of Vcc=1.8V range (Vcc=1.5V to 2V) and Vin=2.5V in case of Vcc=3V range (Vcc=2.5V to 3.6V). In this case, the booster circuit 10 is generally designed so as to output a desired output voltage in case of Vcc=1.5V, namely, Vin=1.5V.

In this case, however, when the power source voltage Vcc is on the side of the Vccmax, or when the power source voltage Vcc in the burn-in step is higher than Vccmax, if the supply voltage Vin is set to be High according to the power source voltage Vcc, the booster circuit 10 results in possession of an excessive boosting capacity. For example, in case that the booster circuit 10 is designed so as to output a desired output voltage in case of Vcc=1.5V and Vin=1.5V, the booster circuit 10 has an excessive capacity with setting of Vcc=3V and Vin=2.5V (>1.5V).

Further, when the supply voltage Vin is set to be higher according to a relatively high power source voltage Vcc, all the boosting stages in the voltage converting circuit VB are boosted on the basis of the supply voltage Vin, so that excessive voltages are applied to transistors in the voltage converting circuit VB. Therefore, some or all of the transistors $QNB_1$ to $QNB_k$ must comprise high breakdown voltage transistors. Since the high breakdown voltage transistor has a lower conductance than that of a low breakdown voltage transistor, it is necessary to increase the size (the channel width) of the former transistor in order to maintain a conductance approximately equal to that of the low breakdown voltage transistor. As a result, since a parasitic capacitance increases, there occur a problem that an operation efficiency of the voltage converting circuit VB lowers and a problem that a circuit area of the booster circuit 10 becomes large.

In order to solves the above problem, for example, Vin can be set to 1.5V even in case of Vcc=3V. However, a voltage drop of Vcc=3V down to 1.5V causes waste of power, which is undesirable. That is, considering the power consumption in the range of Vcc=3V, a consumed current of a product corresponding to both Vcc=1.8V range and Vcc=3V range becomes larger than that of a product corresponding to only Vcc=3V range.

SUMMARY OF THE INVENTION

A semiconductor device comprises a booster circuit portion including a plurality of first switching elements connected in series from an output portion and a plurality of first capacitors whose one ends are connected between respective adjacent ones of the first switching elements, the booster circuit portion being inputted with clock signals from the other ends of the first capacitors to output a boosted voltage from the output portion; and a voltage converting circuit portion comprising a plurality of boosting stages each of which includes a second capacitor whose one end is connected to a first voltage source via a second switching element and whose other end is connected to a reference voltage via a third switching element, said second capacitor being charged according to a voltage difference between the first voltage source and the reference voltage, and comprising a plurality of fourth switching elements each of which is provided at least between adjacent ones of the boosting stages to control the number of the second capacitors connected in series between a second power source and the other ends of the first capacitors on the basis of the voltages of the first and second voltage sources, said voltage converting circuit portion outputting clock signals with phases opposed to each other to adjacent ones of the first capacitors.

DETAILED DESCRIPTION OF THE INVENTION

Figure 1:
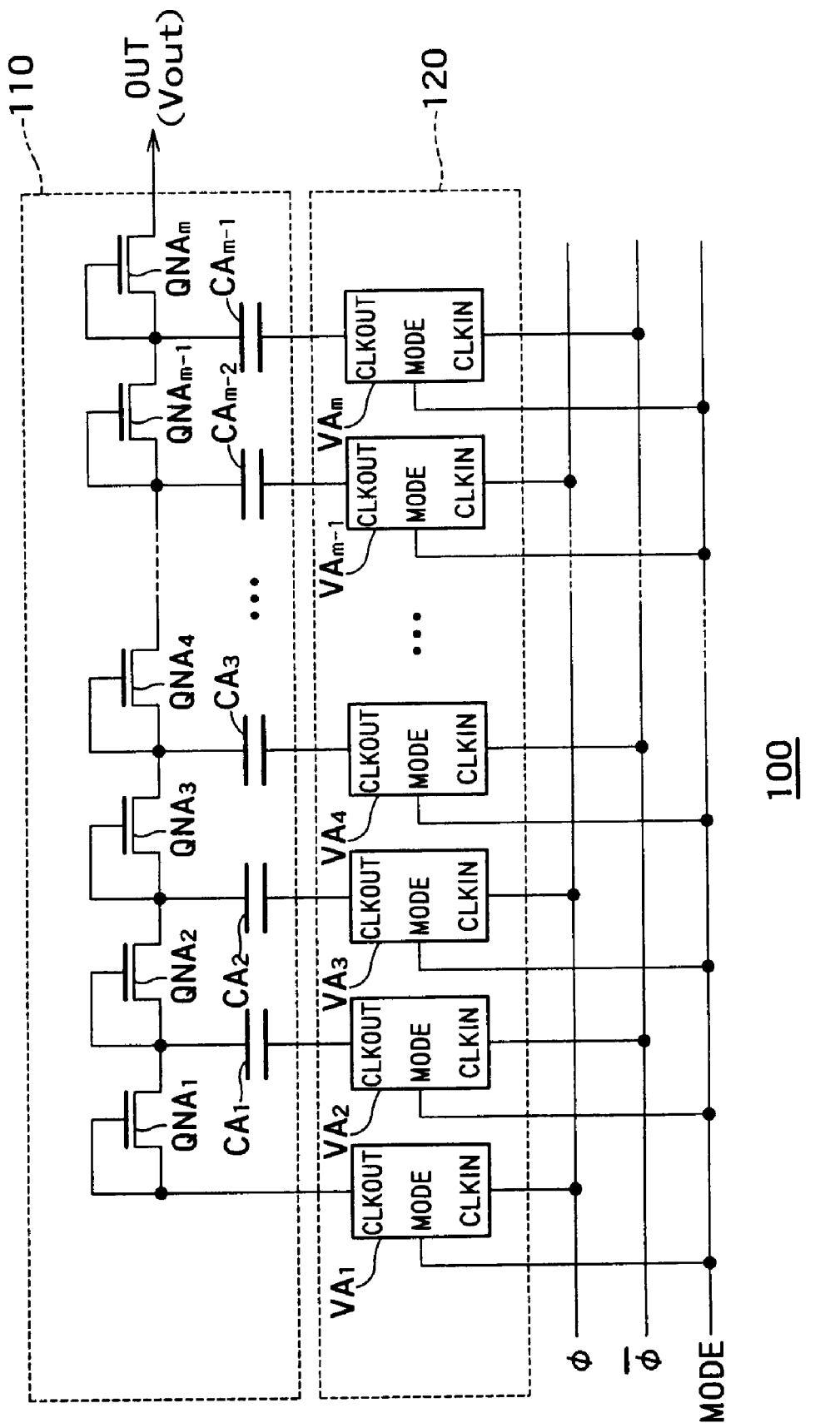
FIG. 1 is a circuit diagram of a booster circuit 100 which is housed in a semiconductor device according to a first embodiment of the present invention.

Embodiments of the present invention will be explained below with reference to the drawings. The present invention is not limited to the following embodiments. Same constitutional elements or parts in respective embodiments are attached with same reference numerals. Further, in the following embodiments, even if p-type transistors are used instead of the n-type transistors and n-type transistors are used instead of the p-type transistors, advantages or merits obtained by these embodiments are not lost.

A semiconductor device according each of the following embodiments is provided between a clock supplying portion and a booster portion with a voltage converting circuit which can increase/decrease the number of boosting stages according to a power source voltage. Therefore, a booster circuit in the semiconductor device can supply a stable output voltage in a wide range of a power source voltage. These embodiments can be each used in a semiconductor device requiring a voltage higher than that of a power source voltage for a NAND type non-volatile memory or the like.

First Embodiment

FIG. 1 is a circuit diagram of a booster circuit 100 embedded in a semiconductor device according to a first embodiment of the present invention. A semiconductor device is further provided with, for example, a non-volatile memory (not shown), and the booster circuit 100 outputs a boosted voltage to the non-volatile memory.

The booster circuit 100 is provided with a booster portion 110 and a voltage converting circuit portion 120. The booster portion 110 includes n-type transistors $QNA_1$ to $QNA_m$, and capacitors $CA_1$ to $CA_{m-1}$. Incidentally, m is an integer which is 2 or more. The transistors $QNA_1$ to $QNA_m$ are connected in series from an output portion OUT. Each of the capacitors $CA_1$ to $CA_{m-1}$ is connected at its one terminal to a connection point between adjacent transistors of the transistors $QNA_1$ to $QNA_m$. The other terminals of the capacitors $CA_1$ to $CA_{m-1}$ are connected to the voltage converting circuit portion 120. Each of the transistors $QNA_1$ to $QNA_m$ is a MOSFET (Metal-Oxide Semiconductor Field Effect Transistor), for example. Each of the capacitors $CA_1$ to $CA_{m-1}$ is a MOS capacitor comprising a gate electrode, a gate insulating film, a semiconductor substrate or a well diffusion layer and a diffusion layer coming in electrical contact with the semiconductor substrate or the well diffusion layer, which constitute the transistors $QNA_1$ to $QNA_m$. The gate electrode comprises, for example, a doped silicon, the gate insulating film comprises, for example, a silicon oxide film, and the well diffusion layer comprises, for example, an N-type well diffusion layer formed on the semiconductor substrate.

A large voltage can be applied to insulating films between both electrodes of the capacitors $CA_1$ to $CA_{m-1}$, at a time of boosting operation. Therefore, in order to avoid breakdown of the capacitors $CA_1$ to $CA_{m-1}$, a gate insulating film of a high breakdown voltage transistor is used for an insulating film of each of the capacitors $CA_1$ to $CA_{m-1}$.

The voltage converting circuit portion 120 includes voltage converting circuits $VA_1$ to $VA_m$. Each of the voltage converting circuits $VA_1$ to $VA_m$ is provided with a clock input portion CLKIN, a clock output portion CLKOUT and a mode input portion MODE. The clock input portion CLKIN of a voltage converting circuit $VA_{2k-1}$ is inputted with a clock signal Φ, and the clock input portion CLKIN of a voltage converting circuit $VA_{2k}$ is inputted with a clock signal Φbar (Φbar is a reversed signal of Φ). Incidentally, k is a natural number of m/2 or less. The clock output portion CLKOUT is connected to the other electrode of the capacitors $CA_1$ to $CA_{m-1}$ or the transistor $QNA_1$. Each of the voltage converting circuits $VA_1$ to $VA_m$ has boosting stages (refer to FIG. 2) therein, and it boosts the clock signal Φ or the clock signal Φbar to output the boosted signals from the clock output portion CLKOUT.

Figure 2:
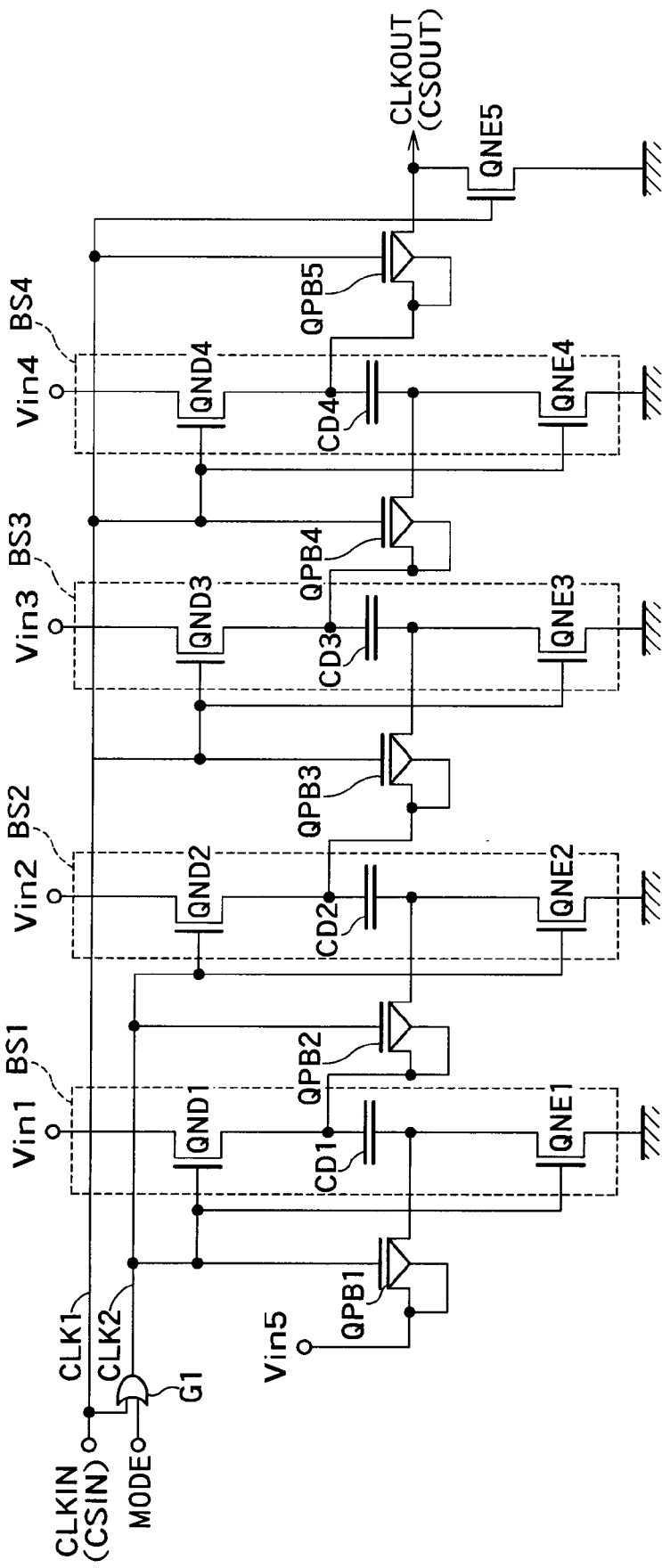
FIG. 2 is a circuit diagram illustrating a constitution of any one of voltage converting circuits $VA_1$ to $VA_m$ (hereinafter, referred to as "a voltage converting circuit VA)

A mode signal inputted into the mode input portion MODE is used for changing the number of boosting stages inside the voltage converting circuits $VA_1$ to $VA_m$ according to magnitudes of the supply voltages $Vin_1$ to $Vin_5$ (refer to FIG. 2). In this embodiment, the mode signal takes two values of High and Low, and switching between the values is conducted according to High or Low of the supply voltage.

Figure 17:
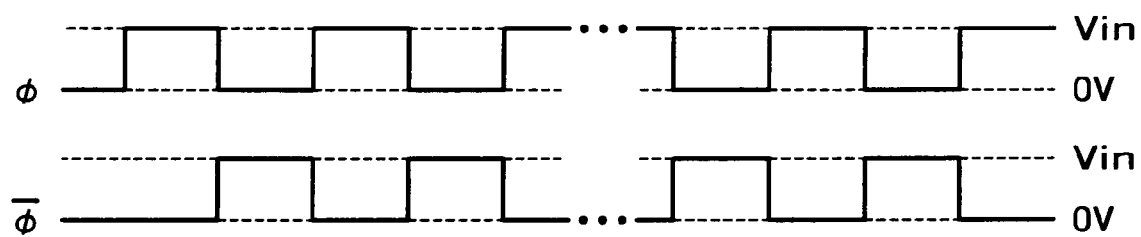
FIG. 17 is a timing chart of clock signals Φ and Φbar.

An operation of the booster circuit 100 will be explained. The clock signals Φ and Φbar have opposite phases to each other, and they repeat High and Low, as illustrated in FIG. 17. The voltage converting circuits $VA_1$ to $VA_m$ boost the clock signal Φ or Φbar by the boosting stages of the number based upon the mode signal and output the boosted signal to the capacitors $CA_1$ to $CA_{m-1}$ as the clock signal $CS_{out}$. The clock signal $CS_{out}$ boosted by the voltage converting circuit $VA_1$ charges the electrode of the capacitor $CA_1$ via the transistor $QNA_1$, which electrode is connected to the transistor $QNA_2$.

Next, the capacitor $CA_1$ receives a clock signal $CS_{out}$ bar with an opposite phase to the clock signal c at an electrode connected to the voltage converting circuit $VA_2$, and it further boosts a voltage at an electrode connected to the transistor $QNA_2$. Thereby, the transistor $QNA_2$ is made conductive, and the capacitor $CA_1$ charges an adjacent capacitor $CA_2$ via the transistor $QNA_2$.

Thereafter, the capacitor $CA_2$ receives a clock signal $CS_{out}$ via the voltage converting circuit $VA_3$ and it further boosts a voltage at an electrode connected to the transistor $QNA_3$. Thereby, the transistor $QNA_3$ is made conductive and the capacitor $CA_2$ charges an adjacent capacitor $CA_3$ via the transistor $QNA_3$. By repeating such an operation, the capacitor $CA_{m-1}$ outputs the boosted voltage from the output portion OUT via the transistor $QNA_m$ as an output voltage Vout.

FIG. 2 is a circuit diagram illustrating a constitution of any one of the voltage converting circuits $VA_1$ to $VA_m$ (hereinafter, referred to as "a voltage converting circuit VA"). The voltage converting circuit VA is provided with boosting stages BS1 to BS4, p-type transistors QPB1 to QPB5 and an OR gate G1.

The boosting stage BS1 includes an n-type transistor QND1, an n-type transistor QNE1 and a capacitor CD1. The boosting stage BS2 includes an n-type transistor QND2, an n-type transistor QNE2 and a capacitor CD2. The boosting stage BS3 includes an n-type transistor QND3, an n-type transistor QNE3 and a capacitor CD3. Further, the boosting stage BS4 includes an n-type transistor QND4, an n-type transistor QNE4 and a capacitor CD4. The transistor QND1, the capacitor CD1 and the transistor QNE1 are connected in series between the supply voltage Vin1 and the ground. The transistor QND2, the capacitor CD2 and the transistor QNE2 are connected in series between the supply voltage Vin2 and the ground. The transistor QND3, the capacitor CD3 and the transistor QNE3 are connected in series between the supply voltage Vin3 and the ground. Further, the transistor QND4, the capacitor CD4 and the transistor QNE4 are connected in series between the supply voltage Vin4 and the ground. Each of the gates of the transistors QND1, QND2, QNE1 and QNE2 is inputted with a clock signal CLK2. Each of the gates of the transistors QND3, QND4, QNE3 and QNE4 is inputted with a clock signal CLK1.

Each of the transistors QPB 2 to QPB4 is provided between adjacent boosting stages of the boosting stages BS1 to BS4. The transistor QPB2 is connected between an electrode on the side of a supply voltage Vin1 of the capacitor CD1 and an electrode on the side of a ground of the capacitor CD2. Similarly, the transistor QPB3 is connected between an electrode of the capacitor CD2 on the side of the supply voltage Vin2 and an electrode of the capacitor CD3 on the ground side thereof. The transistor QPB4 is connected between an electrode on the side of a supply voltage Vin3 of the capacitor CD3 and an electrode on the side of a ground of the capacitor CD4.

The transistor QPB1 is connected between a supply voltage Vin5 and an electrode on the side of a ground of the capacitor CD1, and the transistor QPB5 is connected between an electrode on the side of the supply voltage Vin4 of the capacitor CD4 and the clock output portion CLKOUT. Each of the gates of the transistors QPB1 and QPB2 is inputted with a clock signal CLK2. Each of the gates of the transistors QPB3 to QPB5 is inputted with a clock signal CLK1.

The clock signals CLK1 and CLK2 are generated by a clock signal CSIN (Φ or Φbar) from the clock input portion CLKIN. The clock signal CLK1 is the same signal as the clock signal CSIN. The OR gate G1 outputs a logical OR of the clock signal CSIN and a mode signal from the mode input terminal MODE as the clock signal CLK2.

In this embodiment, the transistors QND1 to QND4, QNE1 to QNE4 and QPB1 to QPB5 may be MOSFETs. The capacitors CD1 to CD4 are, for example, MOS capacitors comprising a gate electrode, a gate insulating film, a semiconductor substrate or a well diffusion layer, and a diffuser layer coming in electrical contact with the semiconductor substrate or the well diffusion layer, which constitute the transistors QND1 to QND4, QNE1 to QNE4 and QPB1 to QPB5. The gate electrode comprises, for example, doped silicon, the gate insulating layer comprises, for example, a silicon oxide film, and the well diffusion layer comprises, for example, an N-type well diffusion layer formed on the semiconductor substrate. Further, it is preferable that the n-type transistors QND1, QND2, QND3 and QND4 are depression type transistors or enhancement type transistors whose threshold voltage is very low. Thereby, the capacitors CD1, CD2, CD3 and CD4 can be charged to voltages which have not been dropped from the supply voltages Vin1, Vin2, Vin3 and Vin4.

The transistors QND1 to QND4, QNE1 to QNE4 and QPB1 to QPB5 all may be low breakdown voltage transistors. The low breakdown voltage transistor is a transistor having a gate insulating film thickness of about 10 nm or less in an Equivalent Oxide Thickness (EOT). An insulating film between electrodes of each of the capacitors CD1 to CD4 may have a low breakdown voltage film thickness, namely, a film thickness of 10 nm or less. Since the transistors QND1 to QND4, QNE1 to QNE4 and QPB1 to QPB5 are the low breakdown voltage transistors, a parasitic capacitance degrading a capacity of the booster circuit becomes small, and a circuit area also becomes small. Since the capacitors CD1 to CD4 are ones for the low breakdown voltage, they can have larger capacitances with smaller areas. Thereby, the entire booster circuit 100 can be reduced in area. It is preferable for facilitating manufacture that an insulating film thickness between the electrodes of each of the capacitors CD1 to CD4 is equal to any one of the gate insulating films of the transistors QND1 to QND4, QNE1 to QNE4 and QPB1 to QPB5.

Figure 3:
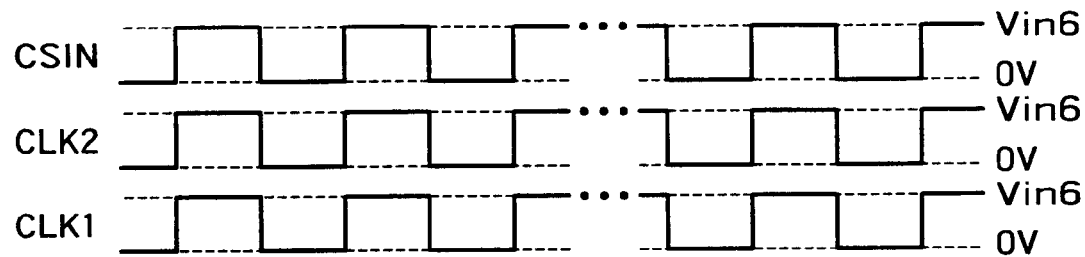
FIG. 3 is a timing chart of a clock signal $CS_{IN}$, a clock signal CLK1 and a clock signal CLK2 in Mode 1.
Figure 4:
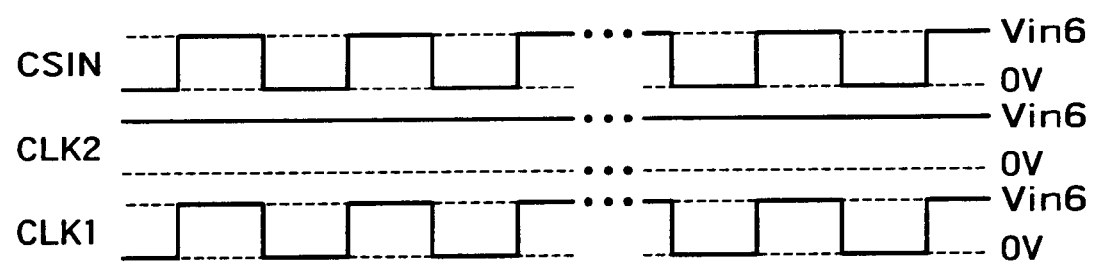
FIG. 4 is a timing chart of the clock signal $CS_{IN}$, the clock signal CLK1 and the clock signal CLK2 in mode 2.

FIG. 3 and FIG. 4 are timing charts of clock signals CSIN, clock signals CLK1 and CLK2 in Mode 1 and Mode 2, respectively. In the Mode 1 illustrated in FIG. 3, the mode signal is Low (non-active state). The Mode 1 is a mode used when the supply voltages Vin1 to Vin5 are relatively low. The case that the supply voltages are Low means a case that, for example, a security range of the power source voltage from the outside of the semiconductor device is a wide range or a dual range and the supply voltages Vin1 to Vin5 are the minimum voltage Vccmin or so in the security range.

In Mode 2 illustrated in FIG. 4, the mode signal is High (an active state). The Mode 2 is a mode used when the supply voltages Vin1 to Vin5 are relatively high. The case that the supply voltages are High means a case that, for example, the security range of the power source voltage from the outside of the semiconductor device is a wide range or a dual range and the supply voltages Vin1 to Vin5 are close to the maximum voltage Vccmax in an security range or the supply voltages Vin1 to Vin5 are set to the voltage Vccmax or more in a burn-in step on trial. An operation of the voltage converting circuit VA will be explained below for each Mode.

(Mode 1)

In Mode 1, the clock signals CLK1 and CLK2 have the same phase and High and Low are repeated. Thereby, all the boosting stages BS1 to BS4 operate.

First, when the clock signals CLK1 and CLK2 are High (Vin6), the transistors QND1 to QND4 and QNE1 to QNE4 are turned on and the transistors QPB1 to QPB5 are turned off. Thereby, the capacitors CD1 to CD4 are respectively charged between the supply voltages Vin1 to Vin4 and the ground. For example, assuming that drop of charging voltage due to respective thresholds of the transistors QND1 to QND4 does not occur, voltages of the supply voltages Vin1, Vin2, Vin3 and Vin4 are charged between respective electrodes of each of the capacitors CD1 to CD4.

Next, when the clock signals CLK1 and CLK2 are Low (a ground potential), the transistors QPB1 to QPB5 are turned on and the transistors QND1 to QND4 and QNE1 to QNE4 are turned off. Thereby, the capacitors CD1 to CD4 are connected in series via the transistors QPB1 to QPB5 between the supply voltage Vin 5 and the clock output portion CLKOUT. As a result, clock signal CSOUT boosted from the supply voltages Vin1 to Vin5 is supplied from the clock output portion CLKOUT to any one of the capacitors $CA_1$ to $CA_m$ illustrated in FIG. 1. The clock signal CSOUT is boosted up to Vin1+Vin2+Vin3+Vin4+Vin5 or so. A voltage of the clock signal CSOUT at this time is defined as VCLK1.

(Mode 2)

In Mode 2, the clock signal CLK2 is kept High and the clock signal CLK1 repeats High and Low. Thereby, the boosting stages BS1 and BS2 do not operate but only the boosting stages BS3 and BS4 operate.

First, when the clock signal CLK1 is High, the transistors QND3, QND4, QNE3 and QNE4 are turned on and the transistors QPB3 to QPB5 are turned off. Thereby, each of the capacitors CD3 and CD4 is charged between each of the supply voltages Vin3, Vin4 and the ground. Each of the voltages of the supply voltages Vin3 and Vin4 is charged between the electrodes of each of the capacitors CD3 and CD4.

Next, when the clock signal CLK1 is Low, the transistors QPB3 to QPB5 are turned on and the transistors QND3, QND4, QNE3 and QNE4 are turned off. Further, since the clock signal CLK2 is always High, the transistors QND1, QND2, QNE1 and QNE2 are ON and the transistors QPB1 to QPB2 are OFF. Thereby, capacitors CD3 to CD4 are connected in series via the transistors QND2 and QPB3 to QPB5 between the supply voltage Vin2 and the clock output portion CLKOUT. As a result, the clock signal CSOUT boosted from the supply voltages Vin2 to Vin4 is supplied from the clock output portion CLKOUT to any one of the capacitors $CA_1$ to $CA_m$ illustrated in FIG. 1. The clock signal CSOUT is boosted up to Vin2+Vin3+Vin4 or so. The voltage of the clock signal $CS_{OUT}$ at this time is defined as VCLK2.

It is apparent that the voltage VCLK2 is smaller than the voltage VCLK1. For example, assuming that the supply voltages Vin1 to Vin5 are Vin, VCLK1=5*Vin and VCLK2=3*Vin.

Therefore, the voltage converting circuit VA in this embodiment boosts a clock signal relatively largely according to Mode 1, when the supply voltages Vin1 to Vin5 are relatively low (for example, about 1.5V), and the voltage converting circuit VA boosts the clock signal relatively small according to Mode 2, when the supply voltages Vin1 to Vin6 are relatively high (for example, about 2.5V or more).

As a result, the voltage converting circuit VA can supply a clock signal CSOUT with a stable voltage to the capacitors $CA_1$ to $CA_m$ without depending on the supply voltages Vin1 to Vin5. That is, the booster circuit 100 illustrated in FIG. 1 can have a stable boosting capacity even if supply voltages from the outside have various voltage values different from each other.

Further, according to this embodiment, when the supply voltages are relatively high, the capacitors CD1 and CD2 in the first and second boosting stages BS1 and BS2 are not charged/discharged. Thereby, even if the supply voltages become large, increase in consumed power in the voltage converting circuit VA is suppressed.

Figure 5:
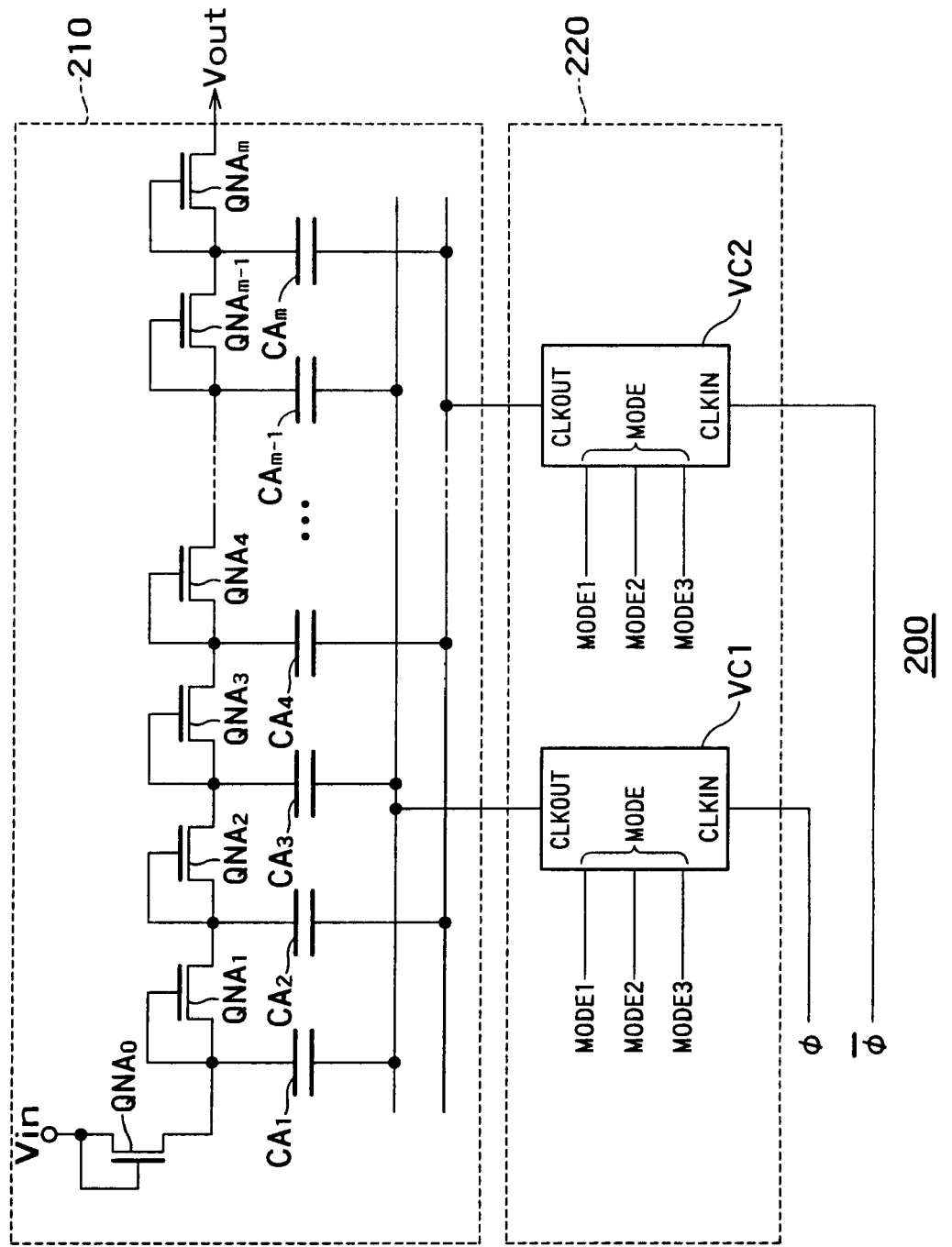
FIG. 5 is a circuit diagram of a booster circuit 200 which is housed in a semiconductor device according to a second embodiment of the present invention.

In this embodiment, the voltage converting circuits $VA_1$ to $VA_m$ have been provided so as to correspond to the transistors $QNA_1$ to $QNA_m$, respectively. However, the voltage converting circuit may be provided for each plurality of transistors of the transistors $QNA_1$ to $QNA_m$. As illustrated in FIG. 5, for example, two voltage converting circuits VA may be provided so as to correspond to the clock signals Φ and Φbar.

All the supply voltages Vin1 to Vin5 may be equal in order to facilitate voltage control on the clock output portion CLKOUT. On the other hand, some of the supply voltages Vin1 to Vin5 may be set to different values and the others may be set to equal values. For example, only the value of the supply voltage Vin5 is larger than those of the other supply voltages.

In this embodiment, all the transistors QPB1 to QPB5, QND1 to QND4 and QNE1 to QNE4 have been the low breakdown voltage transistors, but some of these transistors may be high breakdown voltage transistors due to that some of the supply voltages are set to high voltages. The high breakdown voltage transistor is a transistor having a gate insulating film with a film thickness of about 10 nm or more in an oxide film conversion film thickness. For example, when only the supply voltage Vin2 is made larger than those of the other supply voltages, the transistors QPB2, QND2 and QNE2 may be high breakdown voltage transistors. In this case, the size and parasitic capacitance of the transistors QPB2, QND2 and QNE2 become large, but such an advantage that a boosting capacity is stabilized can be obtained.

In this embodiment, the number of boosting stages is four of the stages BS1 to BS4. However, the number of boosting stages may be three or less, or five or more. Incidentally, it is preferable that the number of boosting stages is four stages or less so as not to increase the parasitic capacitance and not to increase the voltage loss.

Further, in this embodiment, the transistors QPB1 to QPB5 and the transistors QNE1 to QNE4 are driven in a synchronism with each other by the clock signals CLK1 and CLK2. However, in order to prevent the voltage loss from increasing, the transistors QPB1 to QPB5 may be driven with a delay to the transistors QNE1 to QNE4. Further, in this embodiment, such a constitution is employed that the clock signal CLK2 whose amplitude is Vin6 is inputted in all the transistors QND1 and QND2, QNE1 and QNE2, and QPB1 and QPB2, but such a constitution may be employed that some of the these transistors are inputted with a clock signal with the same phase as and an amplitude different from the clock signal CLK2. Further, such a constitution is employed that the clock signal CLK1 whose amplitude is Vin6 is inputted in all the transistors QND3 and QND4, QNE3 and QNE4, and QPB3 to QPB5, but such a constitution may be employed that some of these transistors are inputted with a clock signal with the same phase as and an amplitude different from the clock signal CLK1.

Second Embodiment

FIG. 5 is a circuit diagram of a booster circuit 200 housed in a semiconductor device according to a second embodiment of the present invention. The booster circuit 200 is provided with a booster portion 210 and a voltage converting circuit portion 220. The booster portion 210 includes n-type transistors $QNA_0$ to $QNA_m$, and capacitors $CA_1$ to $CA_m$. The transistors $QNA_0$ to $QNA_m$ are connected in series between a supply voltage Vin and an output portion OUT. Each of the capacitors $CA_1$ to $CA_m$ is connected at its one electrode to a node between adjacent transistors of the transistors $QNA_0$ to $QNA_m$. The other electrodes of the capacitors $CA_1$ to $CA_m$ are connected to the voltage converting circuit portion 220.

The transistors $QNA_0$ to $QNA_m$ may be MOSFETs similar to the transistors $QNA_1$ to $QNA_m$ in the first embodiment. The capacitors $CA_1$ to $CA_m$ may be MOS capacitors similar to the capacitors $CA_1$ to $CA_{m-1}$ in the first embodiment.

The voltage converting circuit portion 220 has voltage converting circuits VC1 and VC2. Each of the voltage converting circuits VC1 and VC2 comprise a clock input portion CLKIN, a clock output portion CLKOUT, and a mode input portion MODE. The clock input portion CLKIN of the voltage converting circuit VC1 is inputted with a clock signal Φ, and the clock input portion CLKIN of the voltage converting circuit VC2 is inputted with a clock signal Φbar. The clock output portion CLKOUT of the voltage converting circuit VC1 is connected to the other electrode of the capacitor $CA_{2k-1}$, and the clock output portion CLKOUT of the voltage converting circuit VC2 is connected to the other electrode of the capacitor $CA_{2k}$. The voltage converting circuit VC1 or VC2 has boosting stages (refer to FIG. 6) therein, and it boosts a clock signal Φ or Φbar illustrated in FIG. 17 to output the same from the clock output portion CLKOUT.

Figure 6:
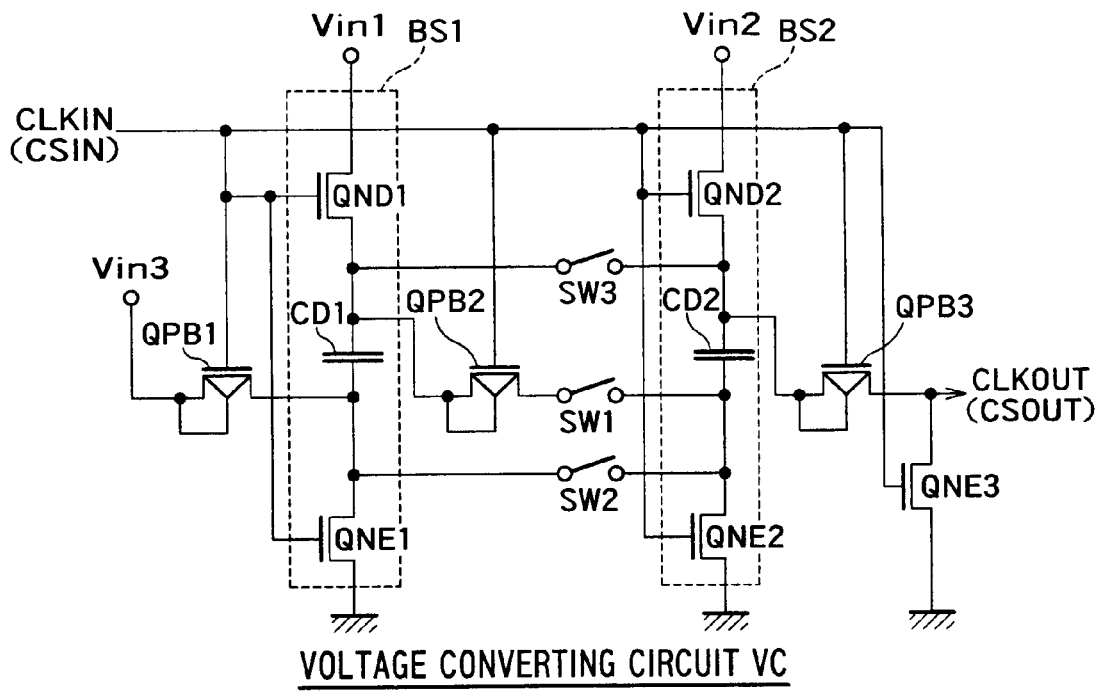
FIG. 6 is a circuit diagram illustrating a constitution of a voltage converting circuit VC.

A mode signal inputted into the mode input portion MODE is used for changing the number of boosting stages or capacitance of the boosting stage inside the voltage converting circuit VC1 or VC2 according to the magnitude of the supply voltages Vin1 to Vin3 (refer to FIG. 6). In this embodiment, the mode signal includes three kinds of MODE1 to MODE3. The details of the MODE1 to MODE3 will be explained with reference to FIG. 7 to FIG. 9.

FIG. 6 is a circuit diagram illustrating a constitution of the voltage converting circuit VC1 or VC2 (hereinafter, called "a voltage converting circuit VC"). The voltage converting circuit VC comprises boosting stages BS1 and BS2, p-type transistors QPB1 to QPB3, and switching elements SW1 to SW3. The boosting stages BS1 and BS2, and the transistors QPB1 to QPB3 may have constitutions similar to the boosting stages BS1 and BS2, and the transistors QPB1 to QPB3 in the first embodiment, respectively.

In this embodiment, the switching elements SW1 to SW3 are provided between the boosting stage BS1 and the boosting stage BS2. The switching element SW1 is connected between an electrode of the capacitor CD1 on the supply voltage Vin1 side thereof and an electrode of the capacitor CD2 on the ground side thereof and is also connected to the transistor QPB2 in series. The switching element SW2 is connected between electrodes of the capacitor CD1 and the capacitor CD2 on the ground sides thereof. The switching element SW3 is connected between electrodes of the capacitor CD1 and CD2 on the respective supply voltages Vin1 sides.

Figure 7:
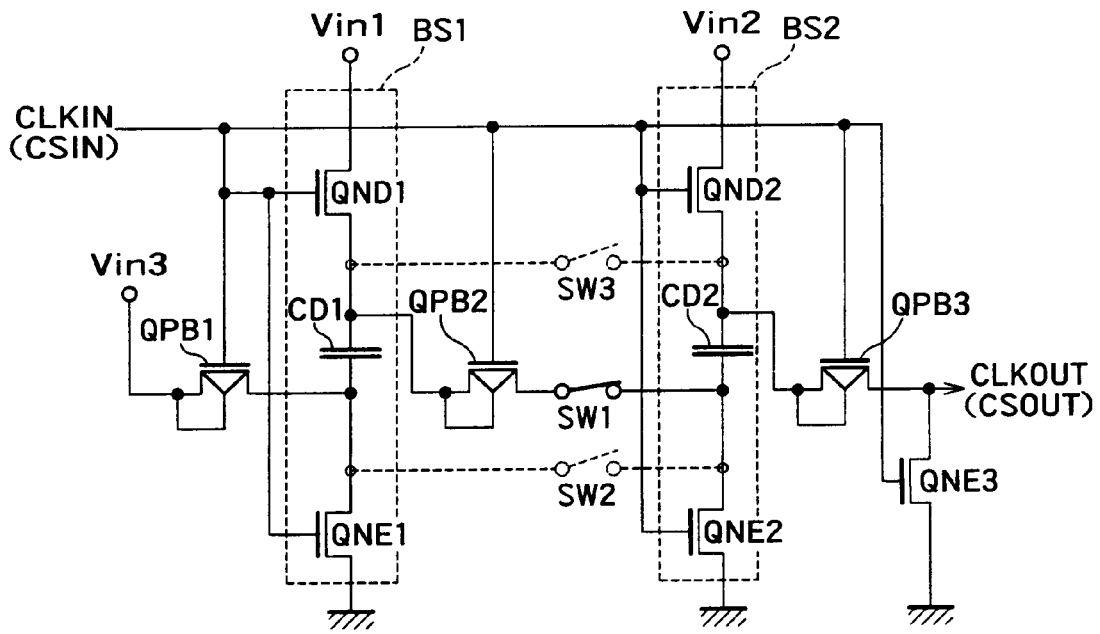
FIG. 7 is an equivalent circuit diagram illustrating an action in Mode 1 of the voltage converting circuit VC.
Figure 8:
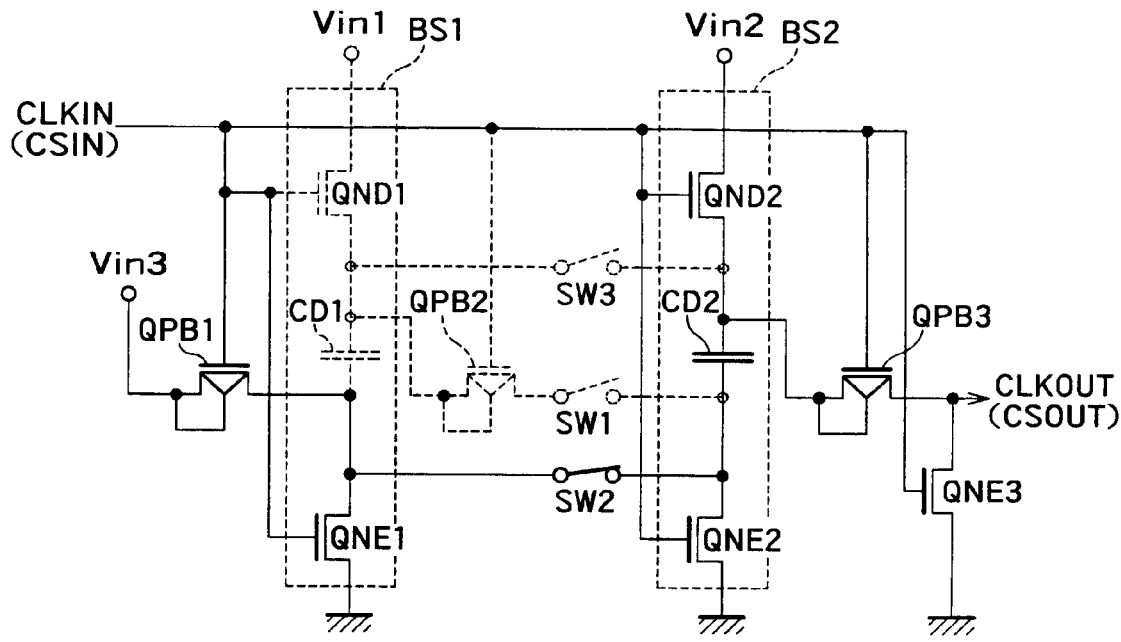
FIG. 8 is an equivalent circuit diagram illustrating an action in Mode 2 of the voltage converting circuit VC.
Figure 9:
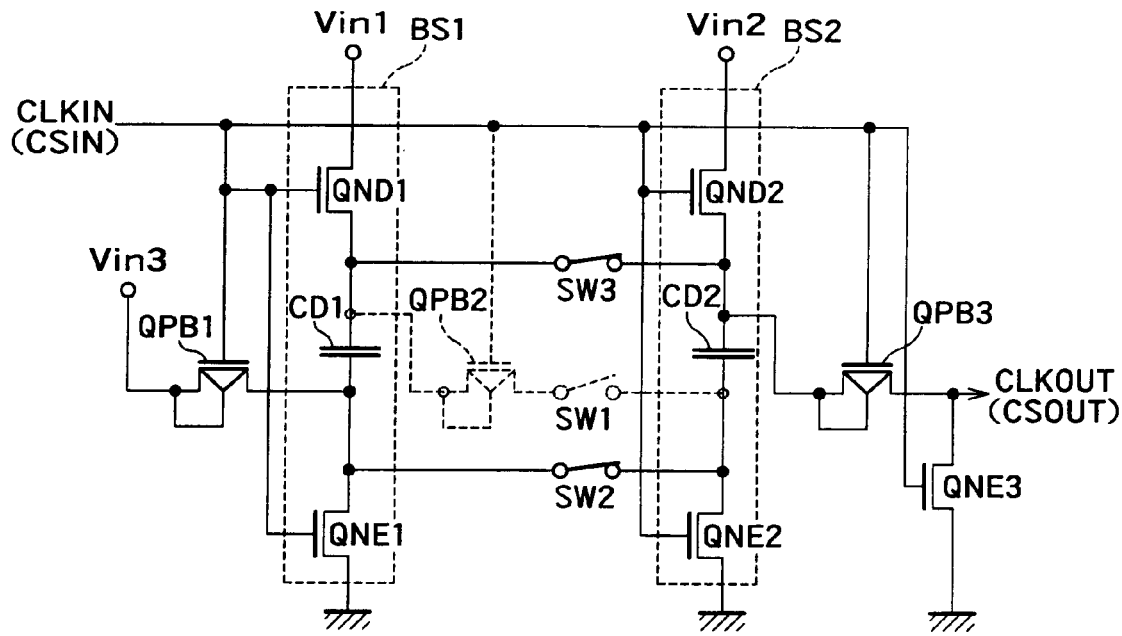
FIG. 9 is an equivalent circuit diagram illustrating an action in Mode 3 of the voltage converting circuit VC.

FIG. 7 to FIG. 9 are equivalent circuit diagrams illustrating operations in respective modes of the voltage converting circuit VC illustrated in FIG. 6. Mode 1 to Mode 3 will be explained with reference to FIG. 7 to FIG. 9.

(Mode 1)

In Mode 1, as illustrated in FIG. 7, the switching element SW1 is ON, and switching elements SW2 and SW3 are OFF. Therefore, since both the boosting stages BS1 and BS2 boost the clock signal CSIN, the Mode 1 is an operation mode corresponding to a case that the supply voltages Vin1 to Vin3 are relatively low.

First, when the clock signal CSIN is High, the transistors QND1, QND2, QNE1 and QNE2 are turned on, and the transistors QPB1 to QPB3 are turned off. Thereby, the capacitors CD1 and CD2 are respectively charged between the supply voltages Vin1, Vin2 and the ground. For example, assuming that charging voltage drop does not occur due to respective threshold values of the transistors QND1 and QND2, voltages of Vin1 and Vin2 are charged between respective electrodes of the capacitors CD1 and CD2.

Next, when the clock signal CSIN is Low, the transistors QPB1 to QPB3 are turned on and the transistors QND1, QND2, QNE1 and QNE2 is turned off. Thereby, the capacitors CD1 and CD2 are connected in series between the supply voltage Vin3 and the clock output portion CLKOUT via the transistors QPB1 to QPB3. As a result, the clock signal CSOUT boosted from the supply voltages Vin1 to Vin3 is supplied from the clock output portion CLKOUT to any one of the capacitors $CA_1$ to $CA_m$ illustrated in FIG. 5. The clock signal CSOUT is boosted up to Vin1+Vin2+Vin3 or so. The clock signal $CS_{OUT}$ at this time is defined as VCLK3.

(Mode 2)

In Mode 2, as illustrated in FIG. 8, the switching element SW2 is ON and the switching elements SW1 and SW3 are OFF. Thereby, since the boosting stage BS1 does not boost the clock signal CSIN and only the boosting stage BS2 boosts the clock signal CSIN, Mode 2 is an operation mode corresponding to a case that the supply voltages Vin1 to Vin3 are relatively high.

First, when the clock signal CSIN is High, the transistors QND2, QNE1 and QNE2 are turned on and the transistors QPB1 and QPB3 are turned off. Thereby, the capacitor CD2 is charged between the supply voltage Vin2 and the ground. The capacitor CD2 is charged to Vin2.

Next, when the clock signal CSIN is Low, the transistors QPB1 and QPB3 are turned on and the transistors QND2, QNE1 and QNE2 are turned off. Thereby, the capacitor CD2 is serially connected between supply voltage Vin3 and the clock output portion CLKOUT via the transistors QPB1 and QPB3. As a result, the clock signal CSOUT boosted from the supply voltages Vin2 and Vin3 is supplied from the clock output portion CLKOUT to any one of the capacitors $CA_1$ to $CA_m$ illustrated in FIG. 5. The clock signal CSOUT is boosted up to Vin2+Vin3 or so. The voltage of the clock signal CSOUT at this time is defined as VCLK4.

It is apparent that the degree of boosting of the voltage VCLK4 is smaller than that of the voltage VCLK3. For example, assuming that the supply voltages Vin1 to Vin5 are Vin, VCLK3=3*Vin and VCLK4=2*Vin are obtained.

Therefore, the voltage converting circuit VC in this embodiment boosts the clock signal relatively large according to Mode 1, when the supply voltage Vin1 to Vin3 are relatively low (for example, about 1.5V), and it boosts the clock signal relatively small according to Mode 2, when the supply voltages Vin1 to Vin3 are relatively high (for example, about 2.2V or more).

(Mode 3)

In Mode 3, as illustrated in FIG. 9, the switching elements SW2 and SW3 are ON and the switching element SW1 is OFF. Therefore, the capacitors CD1 and CD2 are connected in parallel. Thereby, the boosting stages BS1 and BS2 is equivalent to one boosting stage provided with a capacitor (defined as CD12) having a large capacitance corresponding to the capacitance of the capacitor CD1 plus the capacitance of the capacitor CD2. The Mode 3 is an operation mode corresponding to a case that the booster circuit 200 is operated at a power source voltage and a temperature higher than those in the operation security range, particularly in a burn-in step. Incidentally, in Mode 3, the supply voltages Vin1 and Vin2 are Vin12.

First, when the clock signal CSIN is High, the transistors QND1, QND2, QNE1 and QNE2 are turned on and the transistors QPB1 and QPB3 are turned off. Thereby, the capacitor CD12 is charged between the supply voltage Vin12 and the ground. For example, the capacitor CD12 is charged to Vin12.

Next, when the clock signal CSIN is Low, the transistors QPB1 and QPB3 are turned on and transistors QND1, QND2, QNE1 and QNE2 are turned off. Thereby, the capacitor CD2 is connected between the supply voltage Vin3 and the clock output portion CLKOUT via the transistors QPB1 and QPB3. As a result, the clock signal CSOUT boosted from the supply voltages Vin12 and Vin3 is supplied from the clock output portion CLOUT to any one of the capacitors $CA_1$ to $CA_m$ illustrated in FIG. 5. For example, the clock signal CSOUT is boosted up to Vin12+Vin3. The voltage of the clock signal CSOUT at this time is defined as VCLK5. Assuming that Vin3 and Vin12 are Vin, the voltage VCLK5 becomes 2*Vin and it is equal to the voltage VCLK4 in Mode 2. Therefore, when supply voltages Vin1 to Vin3 are relatively high (for example, about 2.2V or more), the clock signal can be boosted relatively small even according to Mode 3.

Further, since the capacitance of the capacitor CD12 is larger than that of the capacitor CD2 in Mode 2, an output current thereof is larger than that in Mode 2. Therefore, Mode 3 is suitable for the burn-in step where a load current on the booster circuit increases due to a leak current and due to an operation at a high temperature. Here, the leak current means a junction leak between the diffusion layers, a sub-threshold leak of a transistor or the like. Since the boosting capacity is high, a consumption current in Mode 3 is larger than that in Mode 2, but increase in consumption current does not cause a problem in the burn-in step.

According to this embodiment, even when voltages supplied externally have different values, respectively, the booster circuit 200 can have a stable boosting capacity. Even in the burn-in step, a stable output voltage can be outputted by using Mode 3 while increasing an output current. Further, in Mode 2, even if the supply voltages are large, increase in consumption power in the voltage converting circuit VC can be suppressed.

The gate oxide films of the low breakdown voltage transistors are used for the insulating films of the capacitors CD1 and CD2. Thereby, the area of the whole booster circuit 200 is reduced.

The capacitance values of the capacitors CD1 and CD2 may be equal to each other. However, the capacitance of the capacitor CD1 may be made larger than that of the capacitor CD2. Thereby, in Mode 1 where the capacitors CD1 and CD2 are connected in series, the amplitude of the clock signal CSOUT can be prevented from lowering from an ideal value due to parasitic capacitances of the transistors QND1, QND2, QNE2, QPB2 and QPB3, the capacitors CD1 and CD2 and wires connecting these members.

Figure 15:
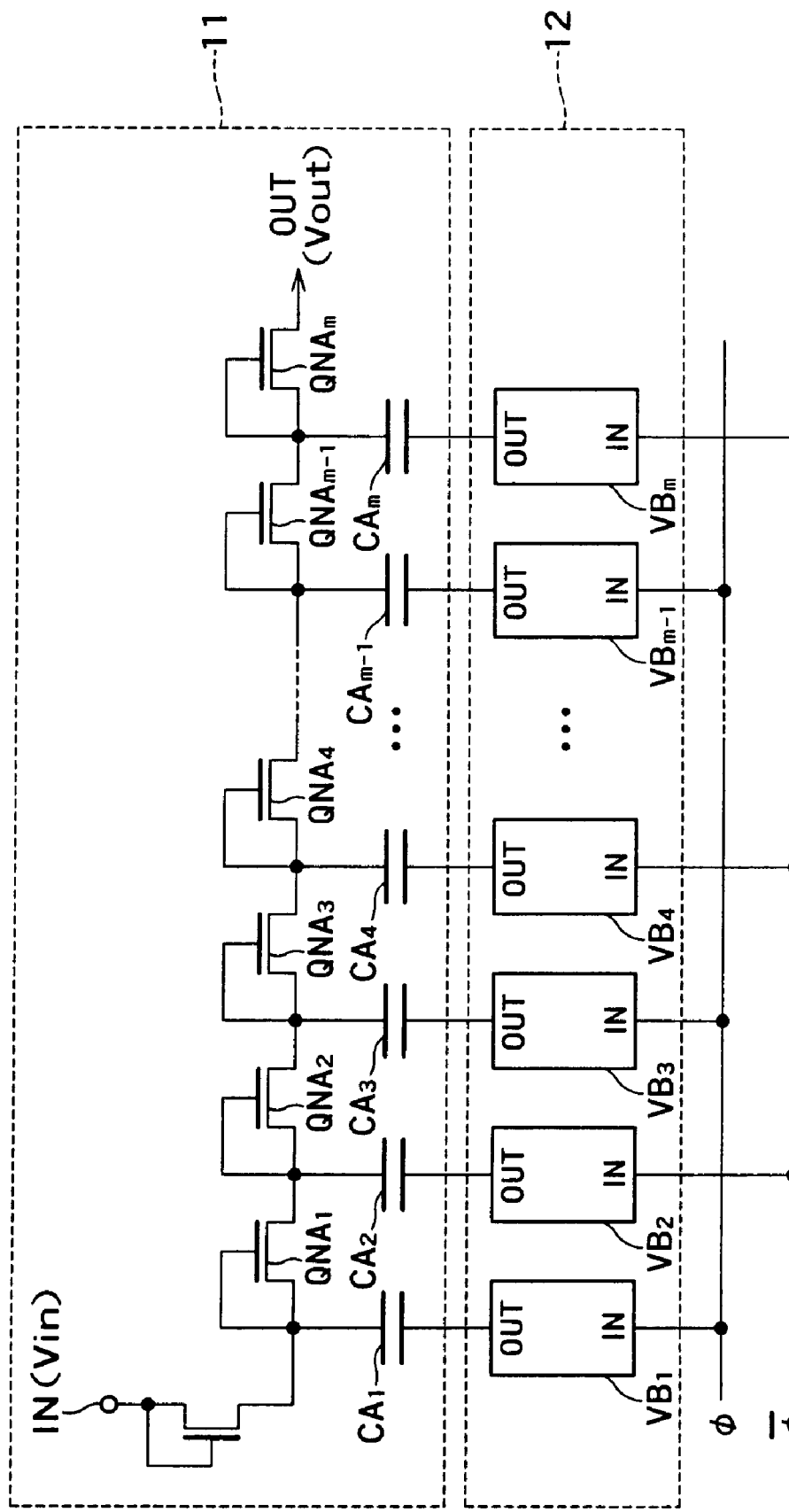
FIG. 15 is a circuit diagram of a booster circuit 10 housed in a conventional semiconductor device.
Figure 16:
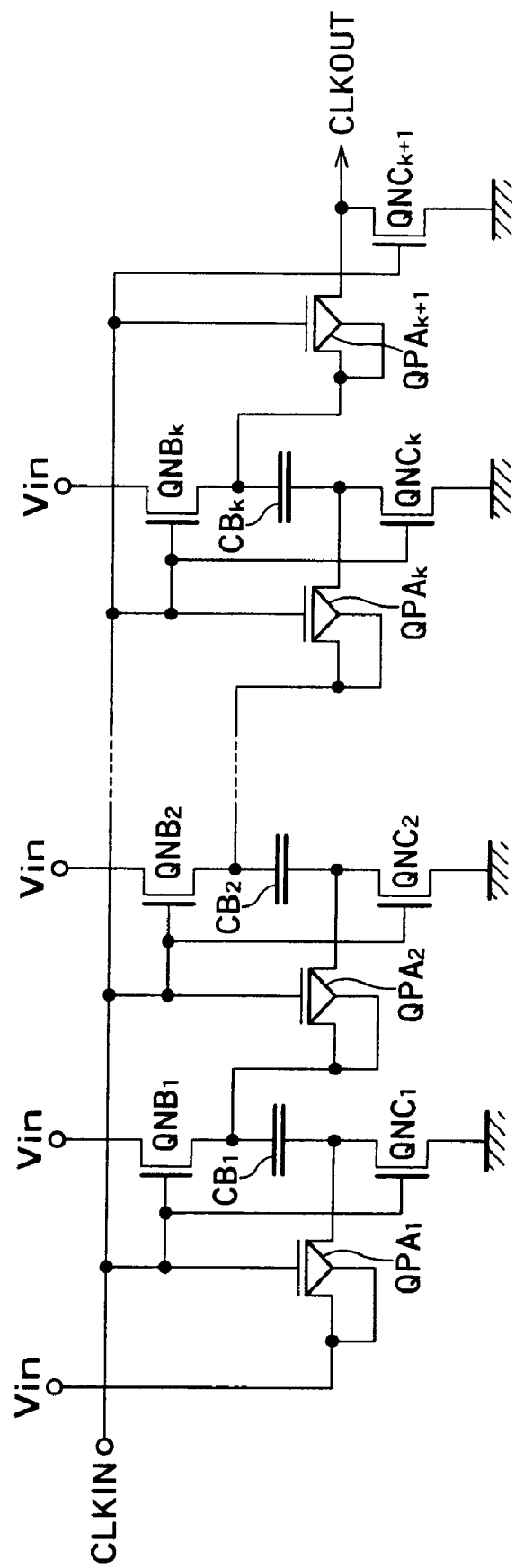
FIG. 16 is a circuit diagram illustrating a constitution of a voltage converting circuit VB.

In this embodiment, the voltage converting circuits VC1 and VC2 are provided as two sets to correspond to the clock signals Φ and Φbar. As illustrated in FIG. 15, however, the voltage converting circuits VC may be provided so as to correspond to the transistors $QNA_1$ to $QNA_m$, respectively.

The supply voltages Vin1 to Vin3 all may be equal to one another in order to facilitate voltage control of the clock output portion CLKOUT. On the other hand, the supply voltages Vin1 to Vin3 may be set to include a different voltage while having the remaining voltages to be equal to each other. For example, only the supply voltage Vin3 may be larger than the remaining supply voltages.

In this embodiment, all the transistors QPB1 to QPB3, QND1, QND2, QNE1 and QNE2 have been the low breakdown voltage transistors. However, some of these transistors may be constituted of high breakdown voltage transistors according to high voltage setting in some of the supply voltages. For example, when only the supply voltage Vin2 is made larger than the other supply voltages, the transistors QPB2, QND2 and QNE2 may be high breakdown voltage transistors. In this case, though the sizes and parasitic capacitances of the transistors QPB2, QND2 and QNE2 become large, such an advantage as a boosting capacity stabilization can be obtained.

In this embodiment, the number of boosting stages is two of the stages BS1 and BS2. However, the number of boosting stages may be three or more. Incidentally, in fact, in order to prevent increase in parasitic capacitance and increase in voltage loss, it is preferable that the number of boosting stages is 4 or less.

In this embodiment, also, the transistors QPB1 to QPB3 and the transistors QNE1 and QNE2 are driven in synchronism with each other by the clock signal CSIN. However, in order to prevent voltage loss from increasing, the transistors QPB1 to QPB3 may be driven with a delay to the transistors QNE1 and QNE2. In the embodiment, further, such a constitution has been employed that all the transistors QND1 and QND2, QNE1 and QNE2, and QPB1 to QPB3 are inputted with the same clock signal CLKIN, but such a constitution may be adopted that some of the transistors may be inputted with a clock signal with the same phase as that of the remaining transistors and an amplitude different from that thereof.

Next, specific examples of the switching elements SW1 to SW3 according to the second embodiment will be shown.

Figure 10:
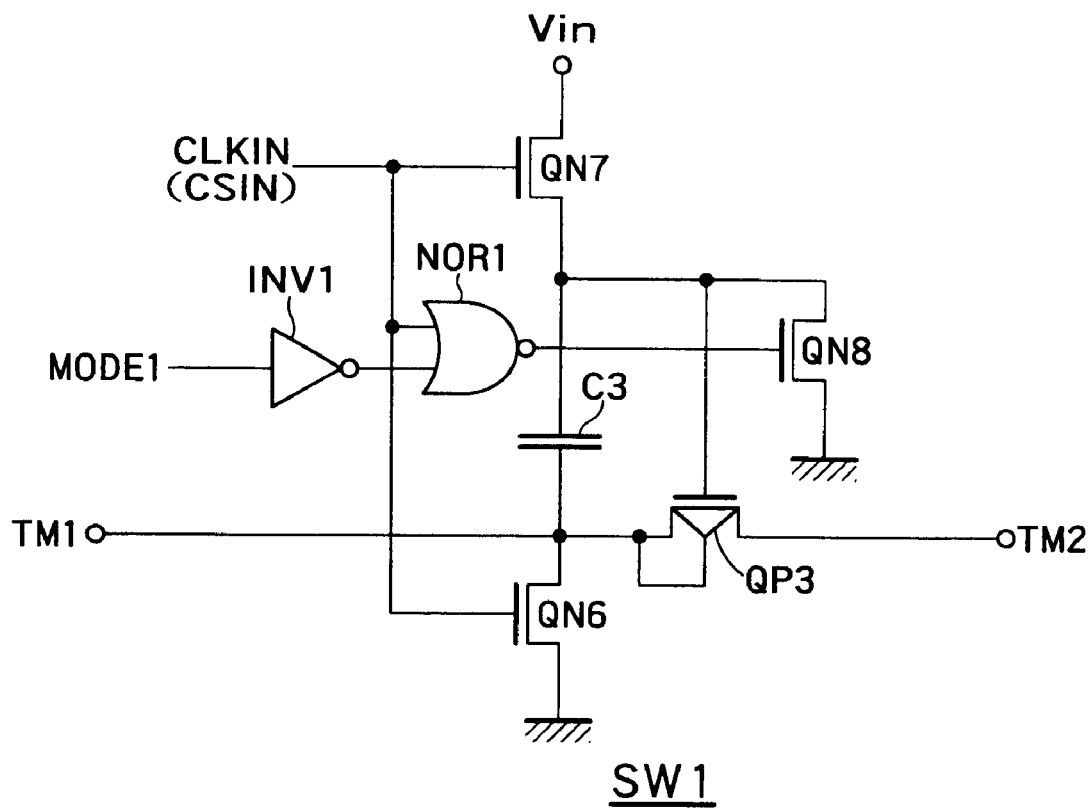
FIG. 10 is one embodiment of a switching element SW1.

FIG. 10 is a circuit diagram illustrating one embodiment of the switching element SW1. Terminals TM1 and TM2 are respectively connected to the transistor QPB2 and the boosting stage BS2. Conductive state or non-conductive state between the terminal TM1 and the terminal TM2 is set by the mode signal MODE1.

The switching element SW1 is provided with a PMOS transistor QP3, a NMOS transistor QN8, a capacitor C3, a NMOS transistor QN6, a NMOS transistor QN7, a NOR gate NOR1 and an inverter INV1. The transistor QP3 may has the same constitution as any one of the transistors QPB1 to QPB3. The transistors QN6, QN7 and QN8 may have the same constitution as the transistor QND1, QND2, QNE1 or QNE2. The capacitor C3 may have the same constitution as the capacitor CD1 or CD2.

The transistor QP3 is connected between the terminal TM1 and the terminal TM2. A back gate of the transistor QP3 is connected to the terminal TM1. The transistor QN7, the capacitor C3 and the transistor QN6 are connected in series between the supply voltage Vin and the ground. The transistor QN8 is connected to a gate of the transistor QP3 and is further connected between a connection node of the transistor QN7 and the capacitor C3, and the ground.

The NOR gate NOR1 is inputted with a signal of the mode signal MODE1 inverted by the inverter INV1 and inputted with a clock signal CSIN, and outputs a NOR of these signals to the gate of the transistor QN8. The gates of the transistors QN7 and QN6 are inputted with a clock signal CSIN. Incidentally, Vin may be any one of Vin1 to Vin3.

When the clock signal CSIN is High (Vin), the transistors QN6 and QN7 are turned on and the transistor QN8 is turned off. Thereby, the terminal TM1 becomes a ground potential and the gate potential of the transistor QP3 becomes Vin, so that the transistor QP3 is turned off. Incidentally, it has been assumed that a voltage drop does not occur due to a threshold value of the transistor QN7. At this time, the other electrode of the capacitor C3 is charged to the voltage of the Vin1. The terminal TM2 is grounded via the boosting stage BS2, when the clock signal CSIN is High. Thereby, a forward bias is not applied between the drain and the N well (channel portion) of the transistor QP3. As a result, the terminal TM1 and the terminal TM2 are made in a non-conductive state to each other.

When the clock signal CSIN is Low (a ground potential), the transistors QN6 and QN7 are turned off. At this time, when the mode signal MODE1 is High (in an active state), the transistor QN8 is turned on. Thereby, the gate potential of the transistor QP3 becomes the ground potential, so that the transistor QP3 is turned on. That is, the terminal TM1 and the terminal TM2 are put in a conductive state to each other.

On the other hand, when the mode signal MODE1 is Low (in a non-active state), the transistor QN8 is turned off. Thereby, since the voltage Vin1 is held between the gate and the source of transistor QP3 by the capacitor C3, the transistor QP3 is turned off. That is, the terminal TM1 and the terminal TM2 are put in a non-conductive state.

The switching element SW1 is made conductive or non-conductive between the terminal TM1 and TM2 depending on the clock signal CSIN, when the mode signal MODE1 is High. However, the switching element SW1 may maintain a conductive state between the terminals TM1 and TM2 regardless of the state of the clock signal CSIN, when the mode signal MODE1 is High.

Figure 11:
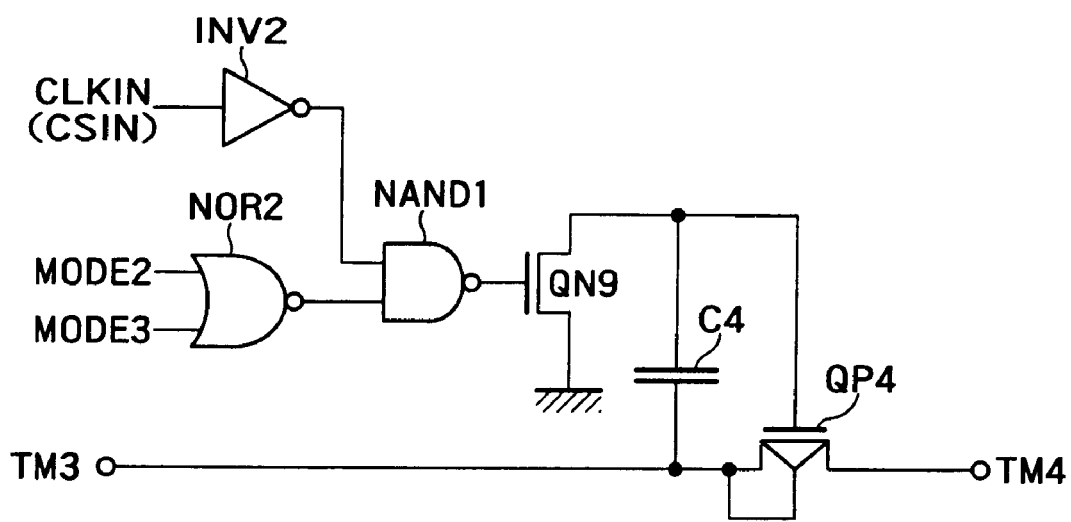
FIG. 11 is one embodiment of a switching element SW2.

FIG. 11 is a circuit diagram illustrating one embodiment of the switching element SW2. Terminals TM3 and TM4 are respectively connected to electrodes of the capacitors CD1 and CD2 on the ground sides. The terminal TM3 and the terminal TM4 are made conductive or non-conductive according to the mode signal MODE2 and MODE3.

The switching element SW2 is provided with a PMOS transistor QP4, a NMOS transistor QN9, a capacitor C4, a NAND gate NAND1, a NOR gate NOR2 and an inverter INV2. The transistor QP4 may have the same constitution as any one of the transistors QPB1 to QPB3. The transistor QN9 may have the same constitution as the transistor QND1, QND2, QNE1 or QNE2. The capacitor C4 may have the same constitution as the capacitor CD1 or CD2.

The transistor QP4 is connected between the terminal TM3 and the terminal TM4. The back gate of the transistor QP4 is connected to the terminal TM3. The capacitor C4 is connected between the gate of the transistor QP4 and the terminal TM3. The transistor QN9 is connected between the gate of the transistor QP4 and the ground.

The NOR gate NOR2 is inputted with the mode signal MODE2 and the mode signal MODE3 to output NOR of these signals. The NAND gate NAND1 is inputted with a signal of the clock signal CSIN inverted by the inverter INV2 and an output signal from the NOR gate NOR2 to output NAND of these signals to the gate of the transistor QN9.

When the mode signal MODE2 or the mode signal MODE 3 is High (in an active state), the transistor QN9 is turned on. Thereby, since the transistor QP4 is turned on, the terminal TM3 and the terminal TM4 are make conductive to each other.

When the mode signal MODE2 and the mode signal MODE 3 are Low (in a non-active state) and the clock signal CSIN is High (Vin), the transistor QN9 is turned on, so that the gate potential of the transistor QP4 becomes the ground potential (0V). However, since the terminal TM3 and the terminal TM4 have been grounded via the boosting stages BS1 and BS2, the transistor QP4 is not turned on. At this time, the potential difference between both the electrodes of the capacitor C4 becomes almost 0V.

When the mode signal MODE2 and the mode signal MODE3 are Low (in a non-active state) and the clock signal CSIN is Low (0V), the transistor QN9 is turned off. At this time, since the potential difference 0V is held between the gate and the source of the transistor QP4 by the capacitor C4, the transistor QP4 is turned off. That is, the terminal TM3 and the terminal TM4 are put in a non-conductive state.

Figure 12:
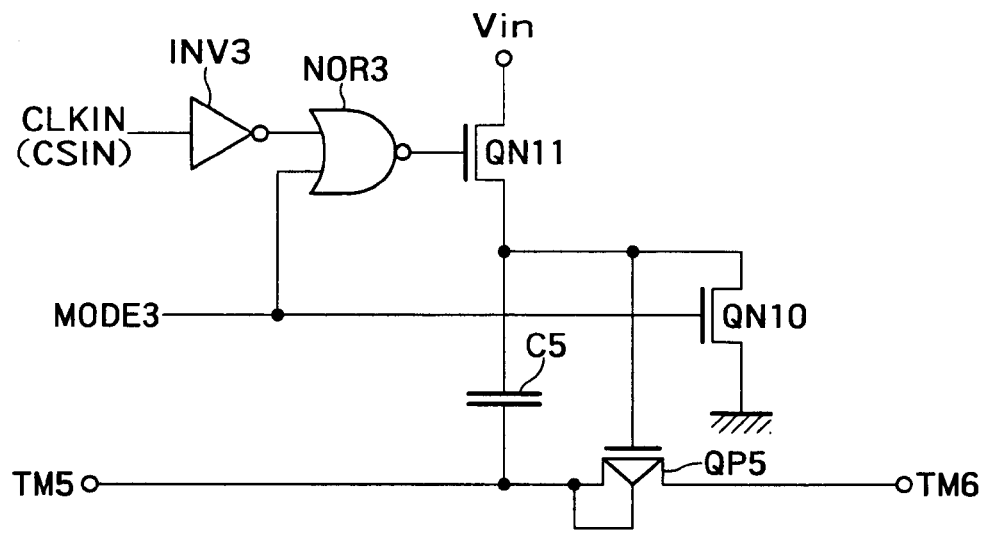
FIG. 12 is one embodiment of a switching element SW3.

FIG. 12 is a circuit diagram illustrating one embodiment of the switching element SW3. Terminals TM5 and TM6 are respectively connected to electrodes of the capacitors CD1 and CD2 on their supply voltage sides. The terminal TM5 and the terminal TM6 are made conductive or non-conductive to each other by the mode signal MODE3.

The switching element SW3 is provided with a PMOS transistor QP5, NMOS transistors QN10 and QN11, a capacitor C5, a NOR gate NOR3 and an inverter INV3. The transistor QP5 may have the same constitution as any one of the transistors QPB1 to QPB3. The transistors QN10 and QN11 may have the same constitution as the transistor QND1, QND2, QNE1 or QNE2. The capacitor C5 may have the same constitution as the capacitor CD1 or CD2.

The transistor QP5 is connected between the terminal TM5 and the terminal TM6. The back gate of the transistor QP5 is connected to the terminal TM5. The capacitor C5 is connected between the gate of the transistor QP5 and the terminal TM5. The transistor QN10 is connected between the gate of the transistor QP5 and the ground. The transistor QN11 is connected between the gate of the transistor QP5 and the supply voltage Vin. The NOR gate NOR3 is inputted with a signal of the clock signal CSIN inverted by the inverter INV3 and the mode signal MODE3 to output NOR of these signals to the gate of the transistor QN11. Further, the mode signal MODE3 is inputted to the gate of the transistor QN10.

When the mode signal MODE 3 is High (in an active state), the transistor QN10 is turned on so that the gate potential of the transistor QP5 becomes the ground potential (0V). Furthermore, when the clock signal CSIN is High, the terminal TM5 and the terminal TM6 are respectively connected to the supply voltage Vin via the boosting stages BS1 and BS2. Moreover, when the clock signal CSIN is Low, the terminal TM5 and the terminal TM6 are boosted up to the supply voltage Vin or more. Thereby, by turning on the transistor QP5, the terminal TM5 and the terminal TM6 are made conductive to each other.

Next, when the mode signal MODE3 is Low (in a non-active state), the transistor QN10 is turned off. Further, when the clock signal CSIN is High (Vin), the transistor QN11 is turned on, and the gate potential of the transistor QP5 becomes Vin. Incidentally, it has been assumed that a voltage drop due to the threshold value of the transistor QN11 does not occur. At this time, the terminal TM5 and the terminal TM6 are respectively connected to the supply voltage Vin via the boosting stages BS1 and BS2. Incidentally, setting is made to be Vin1=Vin2=Vin. Thereby, the transistor QP5 is turned off. At this time, the potential difference between the both electrodes of the capacitor C5 becomes 0V.

When the mode signal MODE3 is Low (in a non-active state) and the clock signal CSIN is Low (0V), the transistor QN11 is turned off, but the potential difference 0V is held between the gate and the source of the transistor QP5 by the capacitor C5. Thereby, the transistor QP5 is turned off. That is, the terminal TM5 and the terminal TM6 are put in a non-conductive state to each other.

In this connection, the aspects of the switching elements SW1 to SW3 illustrated in FIG. 10 to FIG. 12 are merely examples and any switch circuit having a function similar to these switching elements can be used.

Third Embodiment

Figure 13:
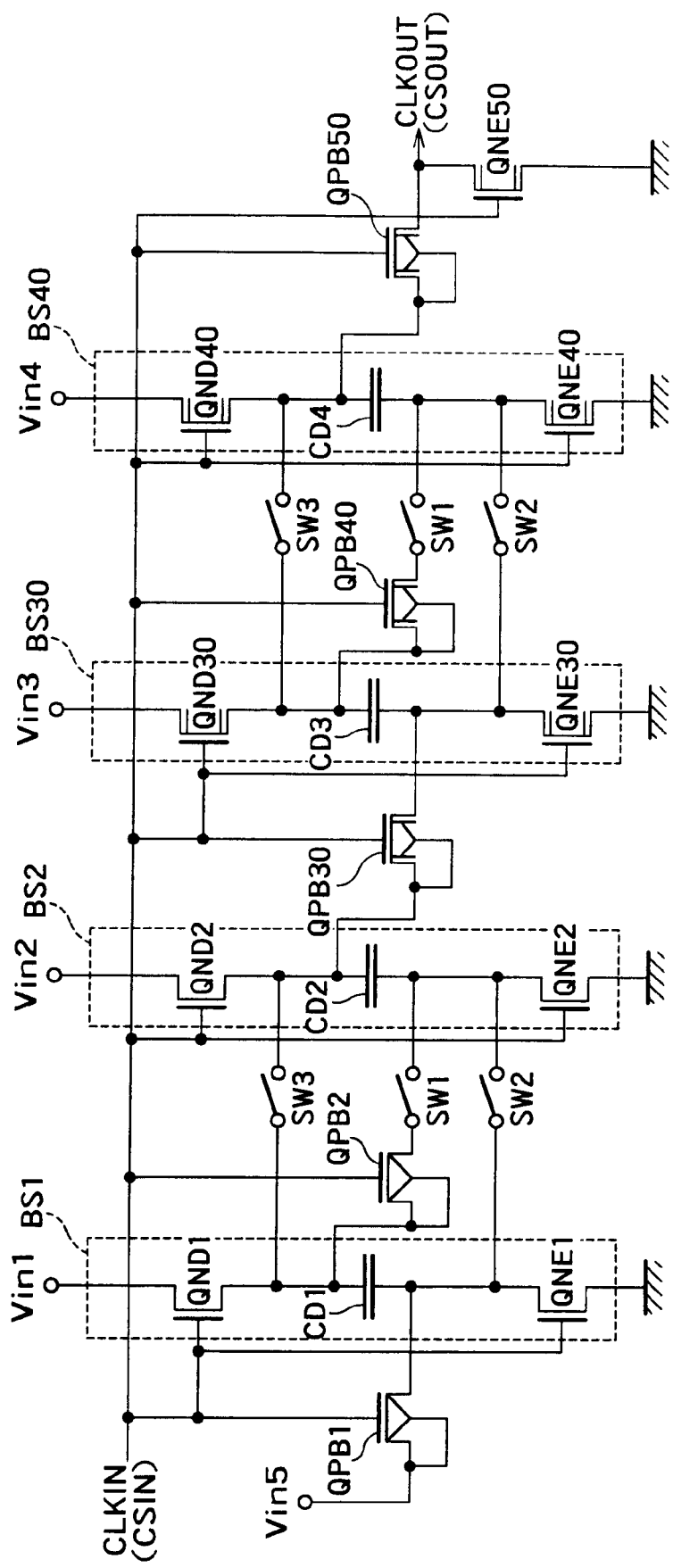
FIG. 13 is a circuit diagram of a voltage converting circuit VD inside a booster circuit according to a third embodiment of the present invention.

FIG. 13 is a circuit diagram of a voltage converting circuit VD in a booster circuit according to the third embodiment of the present invention. As a booster portion may be similar to the booster circuit 110 or 210 in the first or second embodiment, explanation thereof will be omitted. Further, as arrangement of the voltage converting circuits VD in the voltage converting circuit portion may also be similar to that in the voltage converting circuit portion 120 or 220 in the first or second embodiment, explanation thereof will be omitted.

The voltage converting circuit VD has a constitution where the voltage converting circuit VC in the second embodiment has been added with boosting stages BS30 and BS40, p-type high breakdown voltage transistors QPB30 to QPB50, and switching elements SW1 to SW3 for a high breakdown voltage.

The boosting BS30 includes an n-type high breakdown voltage transistor QND30, a capacitor CD3 and an n-type high breakdown voltage transistor QNE30. The transistor QND30, the capacitor CD3 and the transistor QNE30 are connected in series between the supply voltage Vin3 and the ground. The boosting BS40 includes an n-type high breakdown voltage transistor QND40, a capacitor CD4 and an n-type high breakdown voltage transistor QNE40. The transistor QND40, the capacitor CD4 and the transistor QNE40 are connected in series between the supply voltage Vin4 and the ground.

The transistor QPB30 is connected between an electrode of the capacitor CD2 on the supply voltage side thereof and an electrode of the capacitor CD3 on the ground side thereof. The transistor QPB40 and the switching element SW1 are connected in series between an electrode of the capacitor CD3 on the supply voltage side thereof and an electrode of the capacitor CD4 on the ground side thereof. The transistor QPB50 is connected between an electrode of the capacitor CD4 on the supply voltage side thereof and the clock output portion CLKOUT.

The switching element SW2 is connected between electrodes of the capacitor CD3 and the capacitor CD4 on their respective ground sides. The switching element SW3 is connected between electrodes of the capacitor CD3 and CD4 on their respective supply voltage sides.

The voltage converting circuit VD has four boosting stages whose number is more than the number boosting stages included in the voltage converting circuit VC in the second embodiment. Thereby, since a high voltage is generated at the downstream boosting stages BS30 and BS40 generating a high voltage, high breakdown voltage transistors are used as transistors disposed inside the boosting stages BS30 and BS40. On the other hand, since only a potential difference between the supply voltage Vin3 or Vin4 and the ground is applied to the capacitors CD3 and CD4, gate insulating films for a low breakdown voltage may be used in these capacitors. Thereby, a circuit area can be made relatively small.

Like the second embodiment, when the mode signal MODE1 is High (in an active state), the switching element SW1 is ON and the switching elements SW2 and SW3 are OFF. When the mode signal MODE2 is High, the switching element SW2 is ON and the switching elements SW1 and SW3 are OFF. When the mode signal MODE3 is High, the switching elements SW2 and SW3 are ON and the switching element SW1 is OFF. Respective modes will be explained below.

(Mode 1)

The switching element SW1 is on and the switching elements SW2 and SW3 are OFF. At this time, since all the boosting stages BS1 to BS40 boost the clock signal CSIN, Mode 1 is an operation mode conducted when the supply voltages Vin1 to Vin3 are relatively low.

First, when the clock signal CSIN is High, the capacitors CD1 to CD4 are respectively charged between the supply voltages Vin1 to Vin4 and the ground. For example, assuming that a charging voltage drop due to the threshold values of the transistors QND1 to QND40 does not occur, the voltages of the supply voltages Vin1, Vin2, Vin3 and Vin4 are charged between respective electrodes of the capacitors CD1 to CD4.

Next, when the clock signal CSIN is Low, the capacitors CD1 to CD4 are connected in series between the supply voltage Vin5 and the clock output portion CLKOUT via the transistors QPB1 to QPB50. As a result, the clock signal CSOUT boosted from the supply voltages Vin1 to Vin5 is outputted. The clock signal CSOUT is boosted up to Vin1+Vin2+Vin3+Vin4+Vin5 or so. The voltage of the clock signal CSOUT at this time is defined as VCLK7. Assuming that the supply voltages Vin1 to Vin5 are Vin, the voltage VCLK5 becomes 5*Vin or so.

(Mode 2)

The switching element SW2 is ON and the switching elements SW1 and SW3 are OFF. Thereby, since the boosting stages BS1 and BS30 do not operate and only the boosting stages BS2 and BS40 operate, Mode 2 is an operation mode where the supply voltages Vin1 to Vin3 are relatively high.

First, when the clock signal CSIN is High, the capacitors CD2 and CD40 are respectively charged between the supply voltages Vin2 and Vin4, and the ground. For example, the capacitors CD2 and CD40 are respectively charged to Vin2 and Vin4.

Next, when the clock signal CSIN is Low, the capacitors CD2 and CD40 are connected in series between the supply voltage Vin5 and the clock output portion CLKOUT via the transistors QPB1, QPB30 and QPB50. As a result, a clock signal CSOUT boosted from the supply voltages Vin2, Vin4 and Vin5 is outputted. For example, the clock signal CSOUT is boosted up to Vin2+Vin4+Vin5 or so. The voltage of the clock signal CSOUT at this time is defined as VCLK8. For example, assuming that the supply voltages Vin2, Vin4 and Vin5 are Vin, the voltage VCLK8 becomes 3*Vin or so.

It is apparent that the degree of boosting of the voltage VCLK8 is smaller than that of the voltage VCLK7. Therefore, the voltage converting circuit VD boosts the clock signal relatively large according to Mode 1, when the supply voltages Vin1 to Vin5 are relatively low (for example, about 1.5V), and it boosts the clock signal relatively small according to Mode 2, when the supply voltages Vin1 to Vin5 are relatively high (for example, about 2.5V or more).

(Mode 3)

In Mode 3, the switching elements SW2 and SW3 are ON and the switching element SW1 is OFF. Therefore, the capacitors CD1 and CD2 are connected in parallel, and the capacitors CD30 and CD40 are connected in parallel. Thereby, the boosting stages BS1 and BS2 is equivalent to one boosting stage provided with a capacitor (referred to as "CD12") having a large capacitance corresponding to the capacitance of the capacitor CD1 plus the capacitance of the capacitor CD2. Similarly, the boosting stages BS3 and BS4 is equivalent to one boosting stage provided with a capacitor (referred to as "CD34") having a large capacitance corresponding to the capacitance of the capacitor CD30 plus the capacitance of the capacitor CD40. Mode 3 is an operation mode where the booster circuit is operated at power source voltage and a temperature equal to or more than those in an operation security range, particularly in a burn-in step. Incidentally, it is assumed that the supply voltages Vin1 and Vin2 are Vin12, and the supply voltages Vin3 and Vin4 are Vin34.

First, when the clock signal CSIN is High, the capacitors CD12 and CD34 are respectively charged between the supply voltages Vin12 and Vin13 and the ground. For example, the capacitors CD12 and CD34 are respectively charged to Vin12 and Vin34.

Next, when the clock signal CSIN is Low, the capacitors CD12 and CD34 are connected in series between the supply voltage Vin5 and the clock output portion CLKOUT via the transistors QPB1, QPB30 and QPB50. As a result, the boosted clock signal CSOUT is outputted from the supply voltages Vin12, Vin34 and Vin5. For example, the clock signal CSOUT is boosted up to Vin12+Vin34+Vin5 or so. The voltage of the clock signal CSOUT at this time is defined as VCLK9.

For example, assuming that Vin1 to Vin5, Vin12 and Vin34 are Vin, both the voltage VCLK8 and the voltage VCLK9 become 3*Vin or so. Thereby, when the supply voltages Vin1 to vin5 are relatively high (for example, about 2.5V or more), the clock signal can be boosted relatively small even in Mode 3.

Further, since the capacitances of the capacitors CD12 and CD34 are larger than those of the capacitors CD2 and CD4 in Mode 2, an output current is larger than that in Mode 2. Therefore, this Mode 3 is suitable for a burn-in step where a load current on the booster circuit increases due to a leak current and an operation at a high temperature. Here, the leak current means a junction leak of the diffusion layer, a sub-threshold leak of a transistor or the like. Since the boosting capacity is high, a consumption current in Mode 3 is larger than that in Mode 2, but increase in consumption current does not cause a problem in a burn-in step.

Thereby, this embodiment has an advantage or merit similar to that in the second embodiment. The boosting stages BS30 and BS40 of a downstream stage are constituted of high breakdown voltage transistors. Thereby, each voltage converting circuit VD can boost the clock signal CSIN largely.

All the supply voltages Vin1 to Vin5 may be equal in order to facilitate voltage control of the clock output portion CLK-OUT. On the other hand, some of the supply voltages Vin1 to Vin5 may be different in voltage from the remaining supply voltages while having the remaining voltages to be equal to each other.

In this embodiment, the number of boosting stages has been four stages of BS1 to BS4, but it may be three or less, or it may be five or more. Incidentally, in order to prevent increase in parasitic capacitance and in order to increase in voltage loss, it is preferable that the number of boosting stages is four or less.

Further, In this embodiment, the transistors QPB1 to QPB50 and the transistors QNE1 to QNE40 are driven in synchronism with each other by the clock signal CSIN. However, in order to prevent voltage loss from increasing, the transistors QPB1 to QPB50 may be driven with a delay from the transistors QNE1 and QNE40. In the embodiment, further, such a constitution has been employed that all the transistors QND1 and QND40, QNE1 and QNE40, and QPB1 to QPB50 are inputted with the same clock signal CLKIN, but such a constitution may be adopted that some of the transistors may be inputted with a clock signal with the same phase as that of the remaining transistors and an amplitude different from that thereof.

Four Embodiment

Figure 14:
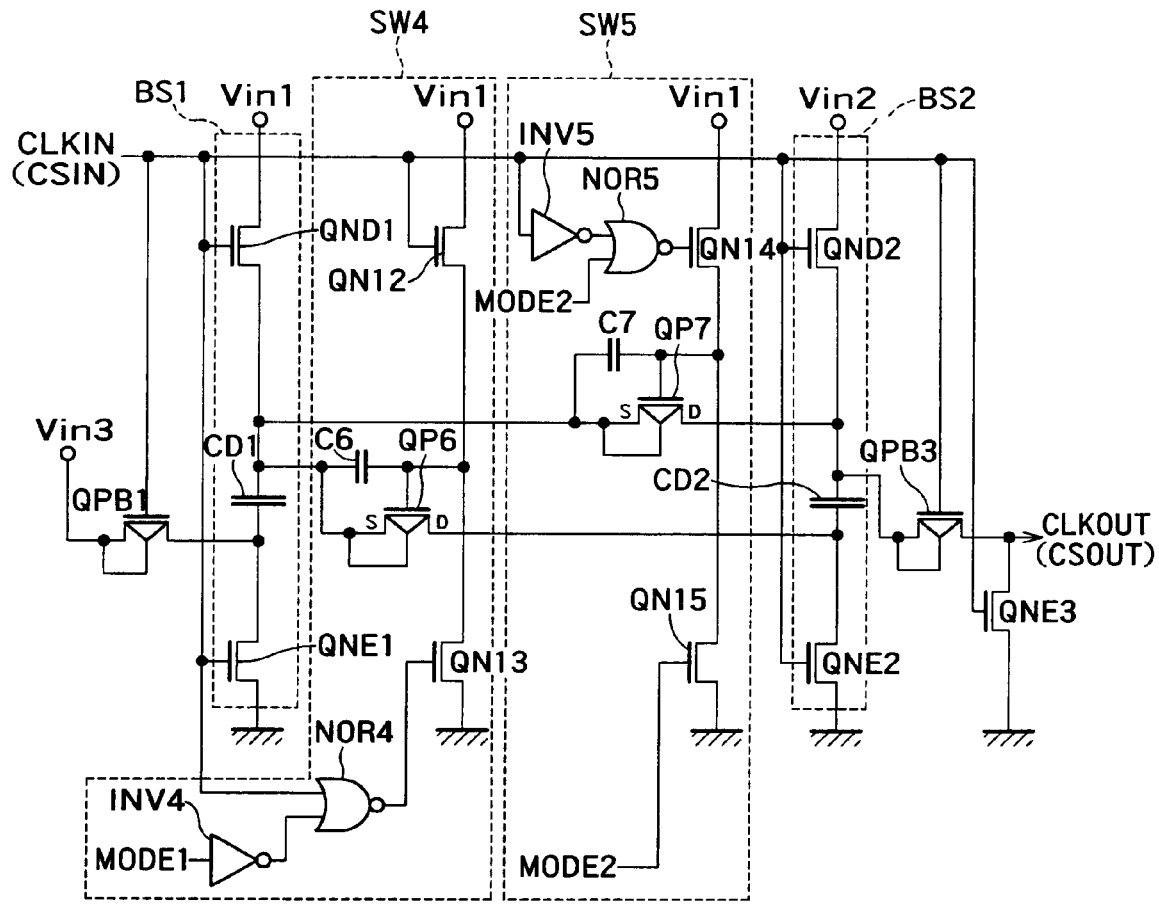
FIG. 14 is a circuit diagram of a voltage converting circuit VE inside the booster circuit according to a fourth embodiment of the present invention.

FIG. 14 is a circuit diagram of a voltage converting circuit VE inside a booster circuit according to a fourth embodiment of the present invention. Since a booster portion may be similar to the booster circuit 110 or 210 in the first or second embodiment, explanation thereof will be omitted. Further, since an arrangement of the voltage converting circuits VE inside the voltage converting circuit portion may also be similar to the voltage converting circuit portion 120 or 220 in the first or second embodiment, explanation thereof will be omitted.

The voltage converting circuit VE comprises boosting stages BS1 and BS2, and switching elements SW4 and SW5. The switching element SW4 is connected between an electrode of the capacitor CD1 on the supply voltage side thereof and an electrode of the capacitor CD2 on the ground side thereof. Thereby, the switching element SW4 operates in the same manner as the switching element SW1 and the transistor QPB4 illustrated in FIG. 7. The switching element SW5 is connected between electrodes of the capacitors CD1 and CD2 on their supply voltage sides thereof. Thereby, the switching element SW5 operates in the same manner as the switching element SW3 illustrated in FIG. 7.

The switching element SW4 is provided with a PMOS transistor QP6, a capacitor C6, an NMOS transistors QN12 and QN13, a NOR gate NOR4, and an inverter INV4. The source and the drain of the transistor QP6 are connected between an electrode of the capacitor CD1 on the supply voltage side thereof and an electrode of the capacitor CD2 on the ground side thereof. The transistors QN12 and QN13 are connected in series between the supply voltage Vin and the ground. A gate of the transistor QP6 is connected to a connection node between the transistors QN12 and QN13, and it is further connected an electrode of the capacitor CD1 on the supply voltage side thereof via a capacitor C6. A back gate of the transistor QP6 is connected to a source of the transistor QP6 and an electrode of the capacitor CD1 on the supply voltage side thereof.

The NOR gate NOR4 is inputted with a mode signal MODE1 through the inverter INV4 and with a clock signal CSIN to output NOR of these signals to the gate of the transistor QN13. The gate of the transistor QN12 is connected to the clock input portion CLKIN.

Next, an operation of the switching element SW4 will be explained. When the mode signal MODE1 is High (in an active state) and the clock signal CSIN is Low, the transistors QN12 and QN13 are turned off and on, respectively. Thereby, since the gate of the transistor QP6 becomes a ground potential, the transistor QP6 is turned on.

When the mode signal MODE1 is High (in an active state) and the clock signal CSIN is High, the transistors QN12 and QN13 are turned on and off, respectively. Thereby, a gate potential of the transistor QP6 is charged to Vin1. Incidentally, it has been assumed that a voltage drop due to a threshold of the transistor QN12 does not occur. At this time, since the source of the transistor QP6 has also been charged to Vin1, the transistor QP6 are turned off. Incidentally, it has been assumed that a voltage drop due to a threshold of the transistor QND1 does not occur. Therefore, when clock signal CSIN is Low, the switching element SW1 makes the boosting stages BS1 and BS2 conductive to each other, and when the clock signal CSIN is High, the switching element SW1 makes the boosting stages BS1 and BS2 non-conductive to each other.

When the mode signal MODE 1 is Low (in a non-active stage), the transistor QN13 is always off. The transistor Q12 is turned on, when the clock signal CSIN is High. Therefore, the gate potential of the transistor QP6 is charged to Vin1. At this time, the source of the transistor QP6 has been charged to Vin1 by the transistor QND1. That is, the source and the gate of the transistor QP6 becomes equal. When the clock signal CSIN is Low, the potential of the source of the transistor QP6 becomes high, but the potential of the gate of the transistor QP6 is kept in a potential approximately equal to that of the source thereof by the capacitor C6, so that the transistor QP6 remains in an off state.

The switching element SW5 is provided with a PMOS transistor QP7, a capacitor C7, an NMOS transistors QN14 and QN15, an inverter INV5, and a NOR gate NOR5. The source and the drain of the transistor QP7 are respectively connected to electrodes of the capacitors CD1 and CD2 on their supply voltage sides. The transistors QN14 and QN15 are connected in series between the supply voltage Vin and the ground. The gate of the transistor QP7 is connected to a connection point between the transistors QN14 and QN15 and it is further connected to an electrode of the capacitor CD1 on the supply voltage side via the capacitor C7. The back gate of the transistor QP7 is connected to the source of the transistor QP7 and an electrode of the capacitor CD1 on the supply voltage side thereof.

The NOR gate NOR5 is inputted with a clock signal CSIN via the inverter INV4 and with a mode signal MODE2 to output a NOR of these signals to the gate of the transistor QN14. The gate of the transistor QN15 is inputted with the mode signal MODE2.

Next, an operation of the switching element SW5 will be explained. When the mode signal MODE2 is High (in an active state), the transistor QN14 is always OFF and the transistor QN15 is always ON Therefore, the potential of the gate of the transistor QP7 becomes a ground potential and the switching element SW5 is put in a conductive state.

When the mode signal MODE2 is Low (in a non-active state), the transistor QN15 is always OFF. When the clock signal CSIN is High, the transistor QN14 is turned on. Therefore, the gate potential of the transistor QP7 is charged to Vin1. Incidentally, it is assumed that a voltage drop due to the threshold of the transistor QN14 does not occur. At this time, since the source of the transistor QP7 has also been charged to Vin1 by the transistor QND1, the source and the gate of the transistor QP7 become the same in potential. When the clock signal CSIN is Low, the potential of the source of the transistor QP7 becomes High, but the potential of the gate of the transistor QP7 is kept in a potential approximately equal to that of the source thereof, so that the transistor QP7 remains in an OFF state.

According to this embodiment, when the mode signal MODE1 is High, the amplitude of the clock signal CSOUT becomes about Vin1+Vin2+Vin3, since the boosting stages BS1 and BS2 are connected in series. When the mode signal MODE2 is High, since the boosting stage BS2 does not operate for boosting, the amplitude of the clock signal CSOUT becomes Vin1+Vin3.

Thus, this embodiment can reduce the number of boosting stages inside the voltage converting circuit VE according to change of the modes. Accordingly, the present embodiment can achieve the same advantage or merit as the first embodiment.

All the supply voltages Vin1 to Vin3 may be the same for facilitating voltage control on the clock output portion CLKOUT. On the other hand, any of the supply voltages Vin1 to Vin3 may be different from the remaining supply voltages while having the remaining voltages to be equal to each other.

In this embodiment, gate insulating layers of low breakdown voltage transistors may be used for the insulating layers of the capacitors constituting the boosting stages BS1 and BS2. Therefore, the areas of these capacitors can be reduced so that a circuit area is reduced.

In this embodiment, the number of boosting stages BS1 to BS2 has been two. However, the number of boosting stages may be three or more. In this connection, in fact, in order to prevent parasitic capacitance from increasing and prevent voltage loss from increasing, it is preferable that the number of boosting stages is four or less.

The capacitance values of the capacitors CD1 and CD2 may be the same. However, the capacitance of the capacitor CD1 may be larger than that of the capacitor CD2. Thereby, in Mode 1 where the capacitors CD1 and CD2 are connected in series, the amplitude of the clock signal CSOUT can be prevented from lowering from an ideal value due to parasitic capacitances of the transistors QND1, QND2, QNE2, QP6, QP7, QN12 to QN15, the capacitors CD1, CD2, C6, C7, and wires connecting these members.

What is claimed is:

1. A semiconductor device comprising:
   a charge pump portion being inputted with first clock signals to output a boosted voltage; and
   converter portions being inputted with second clock signals to output the first clock signals, the converter portions comprising n boosting stages each of which includes a second capacitor element and comprising a plurality of boosting switch elements each of which is provided at least between adjacent ones of the boosting stages to connect and disconnect the second capacitor elements in series between a first voltage source and an output node of the converter portions in response to the second clock signals, wherein
   when at least one of the second capacitor elements is disconnected from other second capacitor elements, the at least one of the second capacitor elements is charged on the basis of a voltage difference between a second voltage source and a reference voltage, and
   the number of the second capacitor elements connected in series from the output node of the converter portions is controlled to each one of m and n (n>m>0) or to each one of 0, m, and n (n>m>0) according to the voltages of the first and the second voltage sources when the boosting switch elements conduct connecting operation.

2. The semiconductor device according to claim 1, wherein:
the charge pump portion includes a plurality of first switching elements connected in series from an output node of the charge pump portion and includes a plurality of first capacitor elements whose one ends are connected between respective adjacent ones of the first switching elements;
the charge pump portion is inputted with the first clock signals from the other ends of the first capacitor elements to output a boosted voltage from the output node of the charge pump portion;
one end of the second capacitor element is connected to the second voltage source via a second switching element and other end of the second capacitor element is connected to the reference voltage via a third switching element; and
the converter portions output the first clock signals with phases opposed to each other to adjacent ones of the first capacitor elements.

3. The semiconductor device according to claim 1, further comprising:
a clock generator portion being inputted with the second clock signals, supplying third clock signals to some of the boosting stages and to the boosting switch elements connected to the some of boosting stages, and supplying fourth clock signals to the remaining boosting stages and to the boosting switch elements connected to the remaining boosting stages, wherein
the third and the fourth clock signals trigger charging the second capacitor elements,
the third and the fourth clock signals turn on the boosting switch elements to connect the second capacitor elements in series, and
the third and the fourth clock signals change the number of the second capacitor elements connected in series from the output node of the converter portions by stopping a clocking operation of either one of the third and the fourth clock signals according to the voltages of the first and second voltage sources.

4. The semiconductor device according to claim 3, wherein
in case that the voltages of the first and the second voltage sources are relatively low, all the second capacitors are alternately charged and connected in series by oscillating the third and the fourth clock signals in response to the second clock signals, and
in case that the voltages of the first and the second voltage sources are relatively high, some of the second capacitors are alternately charged and connected in series by oscillating the third clock signals without oscillating the fourth clock signals.

5. The semiconductor device according to claim 1, wherein:
each boosting switch element connects one end of the second capacitor element in a first boosting stage of the boosting stages and other end of the second capacitor element in a second boosting stage of the boosting stages;
the first and the second boosting stages are adjacent to each other;
the first boosting stage is positioned on a farther side from the output node of the converter portion;
the second boosting stage is positioned on a closer side from the output node of the converter portion;
the semiconductor device further comprises a first switching element, a second switching element, or a third switching element;
the first switching element connects the one end of the second capacitor element in the first boosting stages and the other end of the second capacitor element in the second boosting stages;
the second switching element connects the one ends of the second capacitor elements in the first and the second boosting stages; and
the third switching element connects the other ends of the second capacitor elements in the first and the second boosting stages.

6. The semiconductor device according to claim 1, wherein:
each second capacitor element is a MOS capacitor comprising a gate electrode, a gate insulating film, and a semiconductor substrate or a well diffusion layer.

7. The semiconductor device according to claim 2, wherein:
each second capacitor element is a MOS capacitor comprising a gate electrode, a gate insulating film, and a semiconductor substrate or a well diffusion layer.

8. The semiconductor device according to claim 6, wherein:
a thickness of the gate insulating film is at most 10 nm.

9. The semiconductor device according to claim 7, wherein:
a thickness of the gate insulating film is at most 10 nm.

10. The semiconductor device according to claim 1 further comprising a non-volatile memory, wherein:
the charge pump portion outputs the boosted voltage from an output portion to the non-volatile memory.

11. The semiconductor device according to claim 2 comprising a non-volatile memory, wherein:
the charge pump portion outputs the boosted voltage from the output portion to the non-volatile memory.

12. The semiconductor device according to claim 1, wherein:
the number of boosting stages is at most four.

13. The semiconductor device according to claim 1, wherein:
more than one of the same type of converter portions are provided;
the converter portions adjacent to each other receive the second clock signals having phases opposed to each other; and
the converter portions output the first clock signals having phases opposed to each other to the charge pump portion.

14. The semiconductor device according to claim 1, wherein:
the second voltage sources have a different voltage in some of the boosting stages.

15. The semiconductor device according to claim 2, wherein:
the second and the third switching elements included in the boosting stages are low breakdown voltage transistors.

16. The semiconductor device according to claim 2, wherein:
more than one of the same type of converter portions are provided;
the second and the third switching elements included in the boosting stages located adjacent to an input of the converter portions are low breakdown voltage transistors; and the second and the third switching elements included in the boosting stages located adjacent to an output of the converter portions are high breakdown voltage transistors.

17. The semiconductor device according to claim 1, wherein:
at least one voltage of the first and the second voltage sources is generated by down-transforming a supply voltage.

18. The semiconductor device according to claim 1, wherein:

in a charging operation, the second capacitor elements are charged on the basis of a voltage difference between the second voltage source and the reference voltage;

in a boosting operation, the second capacitor elements are connected in series from the output node of the converter portions; and the charging operation and the boosting operation are alternately operated in every half clock cycle.

* * * * *